US010417487B2

(12) United States Patent
Nomura et al.

(10) Patent No.: US 10,417,487 B2
(45) Date of Patent: Sep. 17, 2019

(54) PATTERN RECOGNITION APPARATUS, PATTERN RECOGNITION METHOD, AND STORAGE MEDIUM

(71) Applicant: CANON KABUSHIKI KAISHA, Tokyo (JP)

(72) Inventors: Osamu Nomura, Yokohama (JP); Masakazu Matsugu, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 321 days.

(21) Appl. No.: 14/833,666

(22) Filed: Aug. 24, 2015

(65) Prior Publication Data

US 2016/0063345 A1   Mar. 3, 2016

(30) Foreign Application Priority Data

Aug. 26, 2014   (JP) .................................. 2014-171891

(51) Int. Cl.
*G06K 9/00* (2006.01)
*G06K 9/46* (2006.01)
(Continued)

(52) U.S. Cl.
CPC ....... *G06K 9/00369* (2013.01); *G06K 9/4633* (2013.01); *G06K 9/6202* (2013.01);
(Continued)

(58) Field of Classification Search
CPC ........... G06K 9/00335; G06K 9/00342; G06K 9/00355; G06K 9/00362; G06K 9/00369;
(Continued)

(56) References Cited

U.S. PATENT DOCUMENTS

2007/0133840 A1* 6/2007 Cilia .................. G06K 9/00369
382/103
2010/0278384 A1* 11/2010 Shotton .............. G06K 9/00369
382/103
(Continued)

FOREIGN PATENT DOCUMENTS

JP   2006-185206 A   7/2006
JP   2009-301088 A   12/2009
JP   2010-273112 A   12/2010

OTHER PUBLICATIONS

J. Shotton et al., "Real-time human pose recognition in parts from single depth images," CVPR 2011, Providence, RI, 2011, pp. 1297-1304.*

(Continued)

*Primary Examiner* — Wesley J Tucker
(74) *Attorney, Agent, or Firm* — Canon USA, Inc., IP Division

(57) ABSTRACT

A pattern recognition apparatus extracts a feature amount of each of a plurality of pixels included in an input image, and calculates, for each of the plurality of pixels, a degree of matching between the feature amount of the pixel and the feature amount of each of one or more pixels included in a peripheral area of the pixel. Then, the pattern recognition apparatus estimates a position of each of a plurality of objects to be recognized by voting for one or more of the plurality of objects to be recognized from each of the plurality of pixels based on the extracted feature amount and the calculated degree of matching.

15 Claims, 19 Drawing Sheets

(51) Int. Cl.
*G06K 9/62* (2006.01)
*G06K 9/32* (2006.01)

(52) U.S. Cl.
CPC .............. *G06K 2009/3291* (2013.01); *G06K 2009/4666* (2013.01)

(58) Field of Classification Search
CPC ....... G06K 9/00375; G06K 2209/4666; G06K 9/6202; G06K 2209/3291; G06K 2009/4666; G06K 9/4633
USPC .......................................................... 382/103
See application file for complete search history.

(56) References Cited

U.S. PATENT DOCUMENTS

| | | | | |
|---|---|---|---|---|
| 2012/0269384 | A1* | 10/2012 | Jones | G06K 9/00201 382/103 |
| 2015/0139533 | A1* | 5/2015 | Wu | G06K 9/00362 382/154 |
| 2016/0085310 | A1* | 3/2016 | Shotton | G06F 3/017 382/103 |

OTHER PUBLICATIONS

Shechtman, Eli, and Michal Irani. "Matching local self-similarities across images and videos." Computer Vision and Pattern Recognition, 2007. CVPR'07. IEEE Conference on. IEEE, 2007.*

Calonder, Michael, et al. "BRIEF: Computing a local binary descriptor very fast." IEEE Transactions on Pattern Analysis and Machine Intelligence 34.7 (2012): 1281-1298.*

Mustafa Özuysal et al, "Fast Keypoint Recognition in Ten Lines of Code", Computer Vision Laboratory, École Polytechnique Fédérale de Lausanne (EPFL) 1015 Lausanne, Switzerland, pp. 1-8.

Yizong Cheng, "Mean Shift, Mode Seeking, and Clustering", IEEE Transactions on Pattern and Machine Intelligence, vol. 17, No. 8, Aug. 1995, pp. 790-799.

Herbert Bay et al., "SURF: Speeded Up Robust Features", ETH Zurich, Katholieke Universiteit Leuven, pp. 1-14.

Berthold K.P. Horn et al., "Determining Optical Flow", Artificial Intelligence Laboratory, Massachusetts Institute of Technology, Cambridge, MA 02139, U.S.A., Artificial Intelligence 17 (1981), pp. 185-203.

* cited by examiner

FIG. 5

| 100001 | 100101 | 100001 | 100100 | 001000 | 001100 | 001000 |
| --- | --- | --- | --- | --- | --- | --- |
| 100001 | 100001 | 101001 | 101100 | 101000 | 001101 | 001100 |
| 100001 | 100101 | 101101 | 101101 | 101101 | 001100 | 001100 |
| 100001 | 001100 | 101101 | 101101 | 001101 | 001101 | 001110 |
| 100001 | 001101 | 101001 | 101001 | 101101 | 101100 | 001100 |
| 110100 | 011101 | 101001 | 101001 | 101001 | 101001 | 001110 |
| 110100 | 110101 | 110101 | 111010 | 101110 | 101110 | 101110 |

FIG. 6

| FEATURE AMOUNT | NECK JOINT | | LEFT SHOULDER JOINT | | RIGHT SHOULDER JOINT | | |
|---|---|---|---|---|---|---|---|
| | AVERAGE RELATIVE POSITION VECTOR | FREQUENCY VALUE | AVERAGE RELATIVE POSITION VECTOR | FREQUENCY VALUE | AVERAGE RELATIVE POSITION VECTOR | FREQUENCY VALUE | |
| 000000 | (30.4, 51.3, 120.4) | 16 | (50.1, 75.9, 103.2) | 3 | — | — | |
| 000001 | (33.8, 31.3, 131.4) | 9 | (52.4, 61.3, 111.2) | 4 | (80.4, 81.3, 90.4) | 2 | |
| 000010 | (31.4, 41.3, 98.3) | 13 | (44.2, 54.2, 99.4) | 8 | (92.1, 77.6, 87.3) | 5 | |
| 000011 | (50.2, 71.7, 70.2) | 5 | (68.8, 43.9, 78.9) | 10 | (85.5, 44.8, 88.6) | 10 | |
| 000100 | — | — | (76.9, 48.2, 89.2) | 14 | (82.1, 66.1, 100.5) | 4 | |
| 000101 | — | — | (72.5, 42.7, 86.8) | 21 | — | — | |

FIG. 10A

| 100001 | 101001 | 101100 | 101000 | 001101 |
|--------|--------|--------|--------|--------|
| 100101 | 101101 | 101101 | 101101 | 001100 |
| 001100 | 101101 | 101101 | 001101 | 001101 |
| 001101 | 101001 | 101001 | 101101 | 101100 |
| 011101 | 101001 | 101001 | 101001 | 101001 |

FIG. 10B

| 2 | 1 | 1 | 2 | 1 |
|---|---|---|---|---|
| 1 | 0 | 0 | 0 | 2 |
| 2 | 0 | - | 1 | 1 |
| 1 | 1 | 1 | 0 | 1 |
| 2 | 1 | 1 | 1 | 1 |

FIG. 11

| FEATURE AMOUNT | NECK JOINT | | LEFT SHOULDER JOINT | | RIGHT SHOULDER JOINT | |
|---|---|---|---|---|---|---|
| | AVERAGE RELATIVE POSITION VECTOR | FREQUENCY VALUE | AVERAGE RELATIVE POSITION VECTOR | FREQUENCY VALUE | AVERAGE RELATIVE POSITION VECTOR | FREQUENCY VALUE |
| 000000 | (30.4, 51.3, 120.4) | 0.82 | — | — | — | — |
| 000001 | (33.8, 31.3, 131.4) | 0.57 | (50.1, 75.9, 103.2) | 0.13 | — | — |
| 000010 | (31.4, 41.3, 98.3) | 0.5 | (52.4, 61.3, 111.2) | 0.21 | (80.4, 81.3, 90.4) | 0.1 |
| 000011 | (50.2, 71.7, 70.2) | 0.16 | (44.2, 54.2, 99.4) | 0.28 | (92.1, 77.6, 87.3) | 0.15 |
| 000100 | — | — | (68.8, 43.9, 78.9) | 0.38 | (85.5, 44.8, 88.6) | 0.38 |
| 000101 | — | — | (76.9, 48.2, 89.2) | 0.75 | (82.1, 66.1, 100.5) | 0.21 |
| | — | — | (72.5, 42.7, 86.8) | 0.95 | — | — |

FIG. 18

| (3) | | | | | | |
|---|---|---|---|---|---|---|
| 2 | 1 | 1 | (2) 2 | 1 | 1 | 1 |
| 1 | 1 | 1 | (1) 0 | 1 | 1 | 2 |
| 2 | 1 | 0 | 0 | 0 | 1 | 2 |
| 1 | 0 | 0 | BASE PIXEL | 1 | 1 | 1 |
| 2 | 1 | 0 | 1 | 0 | 1 | 2 |
| 1 | 2 | 1 | 0 | 0 | 1 | 1 |
| 3 | 2 | 2 | 1 | 2 | 2 | 2 |

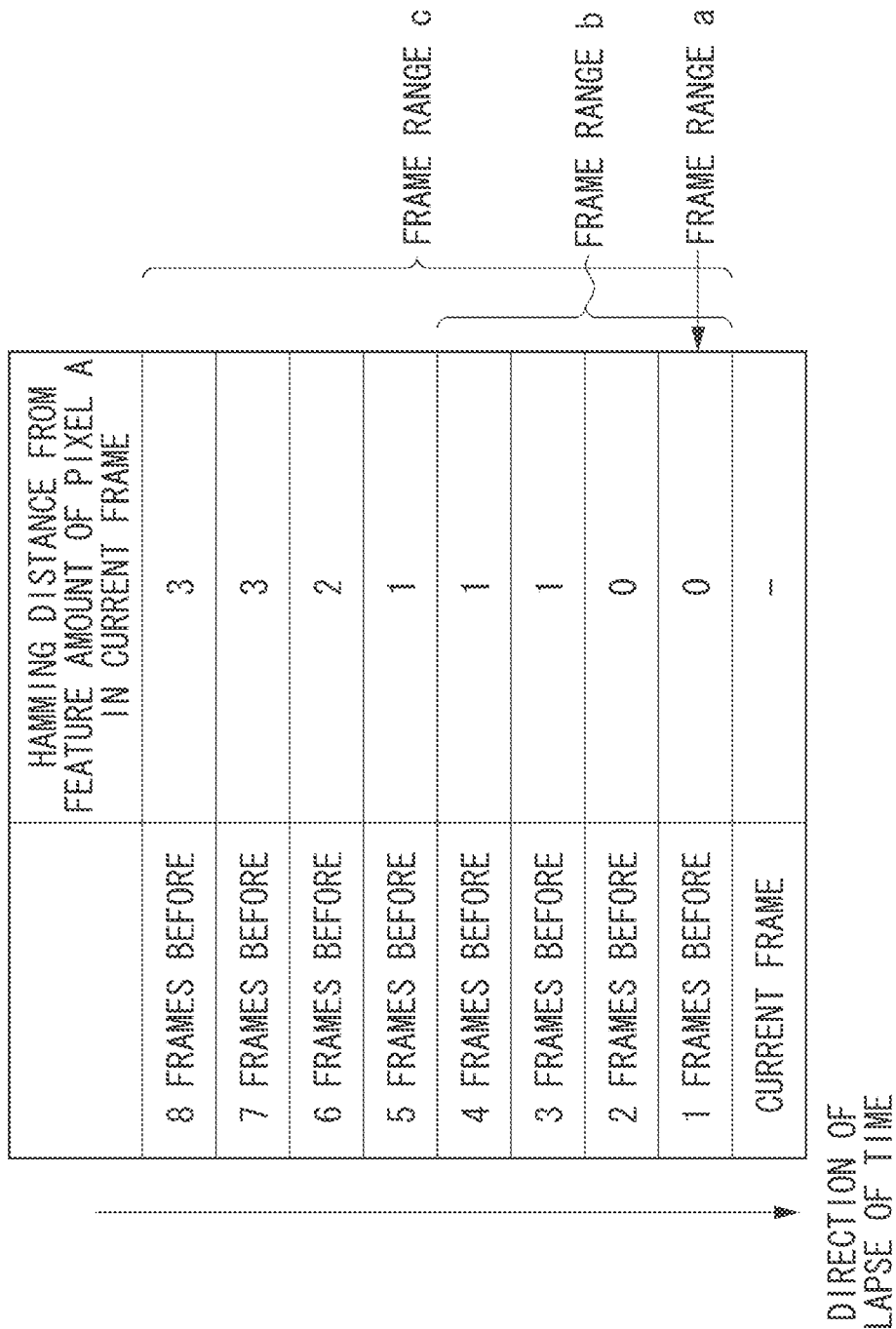

PATTERN RECOGNITION APPARATUS, PATTERN RECOGNITION METHOD, AND STORAGE MEDIUM

BACKGROUND OF THE INVENTION

Field of the Invention

The present disclosure generally relates pattern recognition and, more particularly, to a pattern recognition apparatus, a pattern recognition method, a storage medium, and to a technique used for recognizing an object from an image obtained by an imaging unit.

Description of the Related Art

As a pattern recognition method, for example, a technique discussed in Mustafa Ozuysal, Pascal Fua, Vincent Lepetit, "Fast Keypoint Recognition in Ten Lines of Code," cvpr, pp. 1-8, 2007 IEEE Conference on Computer Vision and Pattern Recognition, 2007 has been known. This technique uses a binary code obtained by comparing pixel values of a reference point pair of an input image as an image feature amount, and achieves pattern recognition processing by referring to a previously-learned dictionary table based on the binary code.

Other examples of the background art include a technique discussed in Japanese Patent Application Laid-Open No. 2010-273112. This technique calculates a degree of association indicating a degree of matching between a feature amount of each person whose head is detected on a past frame image and a feature amount of each person whose head is detected on the current frame image. The heads between which the degree of association is higher than or equal to a threshold and is the maximum are determined to be the head of the same person.

Other examples of the background art include a technique discussed in Japanese Patent Application Laid-Open No. 2009-301088. This technique searches a learning image for learning reference pixels in a plurality of directions from a pixel of interest in the learning image. A reference pixel code calculation unit calculates a bit code serving as a learning reference pixel code from a feature amount comparison value. A reference pixel statistic amount calculation unit calculates a reference pixel statistic amount of learning reference pixels obtained from a plurality of learning images for each event where an input image differs from the learning images. An input pixel code calculation unit calculates an input pixel code from a feature amount comparison value between a pixel of interest in the input image and an input reference pixel lying in a search direction in the input image. An event determination unit determines the occurrence of an event at the pixel of interest in the input image based on the input pixel code and the reference pixel statistic amount. A change of illumination is described as the event.

Other examples of the background art include a technique discussed in Japanese Patent Application Laid-Open No. 2006-185206. This technique generates a background probability value table based on time-series images of a background, and generates a background threshold table indicating a threshold of a degree of similarly to the background based on the time-series images of the background.

Any one of bit codes is assigned to each pixel of interest included in an area of interest of an input image by determining a brightness difference from other pixels. A probability value at which the code of each pixel of interest occurs is determined by referring to the background probability value table for each code. Based on the probability value, the degree of similarity of a pixel area of interest to the background is calculated. The degree of similarity is compared with the threshold of the corresponding pixel area in the background threshold table, whereby whether the pixel area of interest corresponds to an object is determined.

However, according to the technique discussed in Mustafa Ozuysal, Pascal Fua, Vincent Lepetit, "Fast Keypoint Recognition in Ten Lines of Code," cvpr, pp. 1-8, 2007 IEEE Conference on Computer Vision and Pattern Recognition, 2007, processing accuracy may degrade if the calculation results of feature amounts in the pixel positions include an error due to noise or blocking.

The technique discussed in Japanese Patent Application Laid-Open No. 2010-273112 is premised on that the feature amounts in the pixel positions are appropriately calculated in the first place. An adverse effect can thus occur on post-processing if the calculation results of the feature amounts in the pixel positions include an error due to noise or blocking.

Similarly, the technique discussed in Japanese Patent Application Laid-Open No. 2009-301088 is also premised on that the feature amounts in the pixel positions are appropriately calculated. The technique therefore does not accommodate situations where the calculation results of the feature amounts in the pixel positions include an error due to noise or blocking.

Similarly, the technique discussed in Japanese Patent Application Laid-Open No. 2006-185206 does not accommodate situations where luminance values in the pixel positions include an error (a value irrelevant to an object to be recognized) due to noise or blocking.

SUMMARY OF THE INVENTION

The present disclosure is directed to reducing the effect of a feature amount error on recognition performance even if a feature amount calculated in a pixel position includes an error due to noise or blocking.

According to an aspect of the present disclosure, a pattern recognition apparatus includes an extraction unit configured to extract a feature amount of each of a plurality of pixels included in an input image, a calculation unit configured to calculate, for each of the plurality of pixels, a degree of matching between the feature amount of the pixel and the feature amount(s) of one or more pixels included in a peripheral area of the pixel, and an estimation unit configured to estimate a position of a plurality of objects to be recognized by voting for one or more of the plurality of objects to be recognized from each of the plurality of pixels based on the extracted feature amount and the calculated degree of matching.

Further features of the present disclosure will become apparent from the following description of exemplary embodiments with reference to the attached drawings.

BRIEF DESCRIPTION OF THE DRAWINGS

FIG. 5 is a diagram illustrating an example of feature amounts according to the first exemplary embodiment.

FIG. 6 is a diagram illustrating an example of a dictionary according to the first exemplary embodiment.

FIGS. 10A and 10B are diagrams illustrating an example of feature amounts and Hamming distances according to the first exemplary embodiment.

FIG. 11 is a diagram illustrating an example of the dictionary according to the first exemplary embodiment.

FIG. 18 is a diagram illustrating an example of Hamming distances according to a fifth exemplary embodiment.

FIG. 19 is a table illustrating an example of Hamming distances according to the fifth exemplary embodiment.

DESCRIPTION OF THE EMBODIMENTS

Various exemplary embodiments, features, and aspects of the disclosure will be described in detail below with reference to the drawings.

A first exemplary embodiment of the present invention will be described below with reference to the drawings.

The present exemplary embodiment describes an example of a pattern recognition apparatus which extracts predetermined feature amounts from a past input pattern. Based on the extracted feature amounts, the pattern recognition apparatus performs voting processing on objects to be recognized that are present in the input pattern and serve as targets to be voted for. The pattern recognition apparatus then recognizes the objects to be recognized from the input pattern based on a result of the voting processing.

Figure 1:
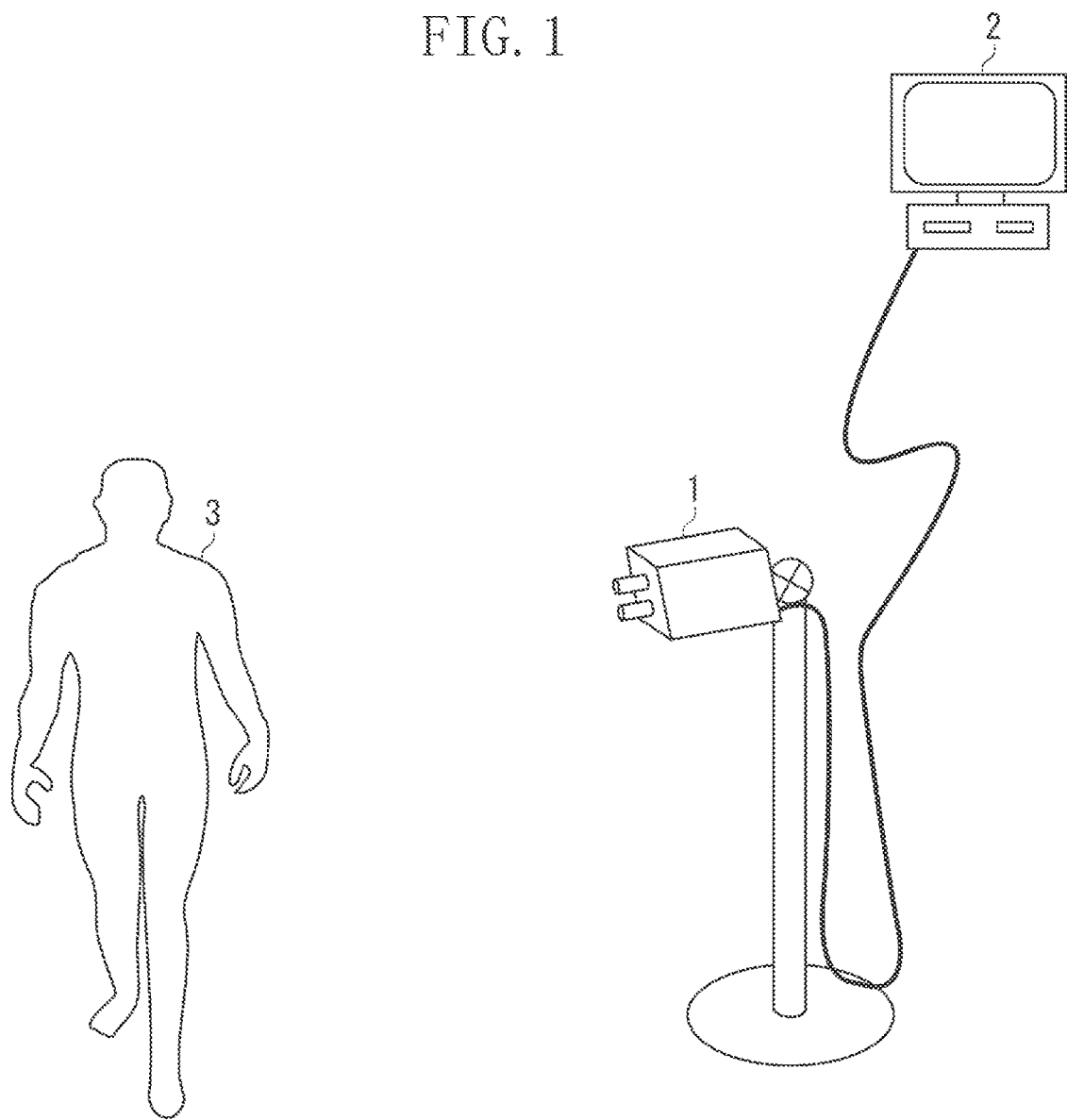
FIG. 1 is a diagram illustrating a pattern recognition apparatus according to an exemplary embodiment of the present disclosure.

The pattern recognition apparatus according to the present exemplary embodiment may be implemented as a pattern recognition program of a computer system installed on a personal computer (PC) 2. The PC 2 is connected to a distance image capturing apparatus 1 illustrated in FIG. 1, and uses a distance image obtained by the distance image capturing apparatus 1 as an input pattern.

As a specific configuration of the pattern recognition apparatus, the pattern recognition apparatus includes a computer system in which a central processing unit (CPU), a read-only memory (ROM), and a random access memory (RAM) are connected via a bus. The pattern recognition apparatus is implemented by loading a pattern recognition program stored in the ROM 22 into the RAM 23 and executing the pattern recognition program by the CPU 21. The pattern recognition apparatus according to an exemplary embodiment of the present disclosure is not limited to the one running on the PC 2 as described above. A pattern recognition apparatus running on a general-purpose processor or a dedicated processor having similar functions is also applicable. As used herein, the term "unit" generally refers to any combination of software, firmware, hardware, or other component, such as circuitry, that is used to effectuate a purpose.

The pattern recognition apparatus according to the present exemplary embodiment uses a distance image as the input pattern to be processed. However, the pattern recognition apparatus according to an exemplary embodiment of the present disclosure is not limited thereto. For example, a pattern recognition apparatus may use a luminance image as the input pattern to be processed. In such a case, a luminance image capturing apparatus is used instead of the distance image capturing apparatus 1. The case with a luminance image as the input pattern will be described in detail after the description of the case with a distance image as the input pattern.

Next, pattern recognition processing performed by the pattern recognition apparatus according to the present exemplary embodiment will be described in detail.

Figure 2:
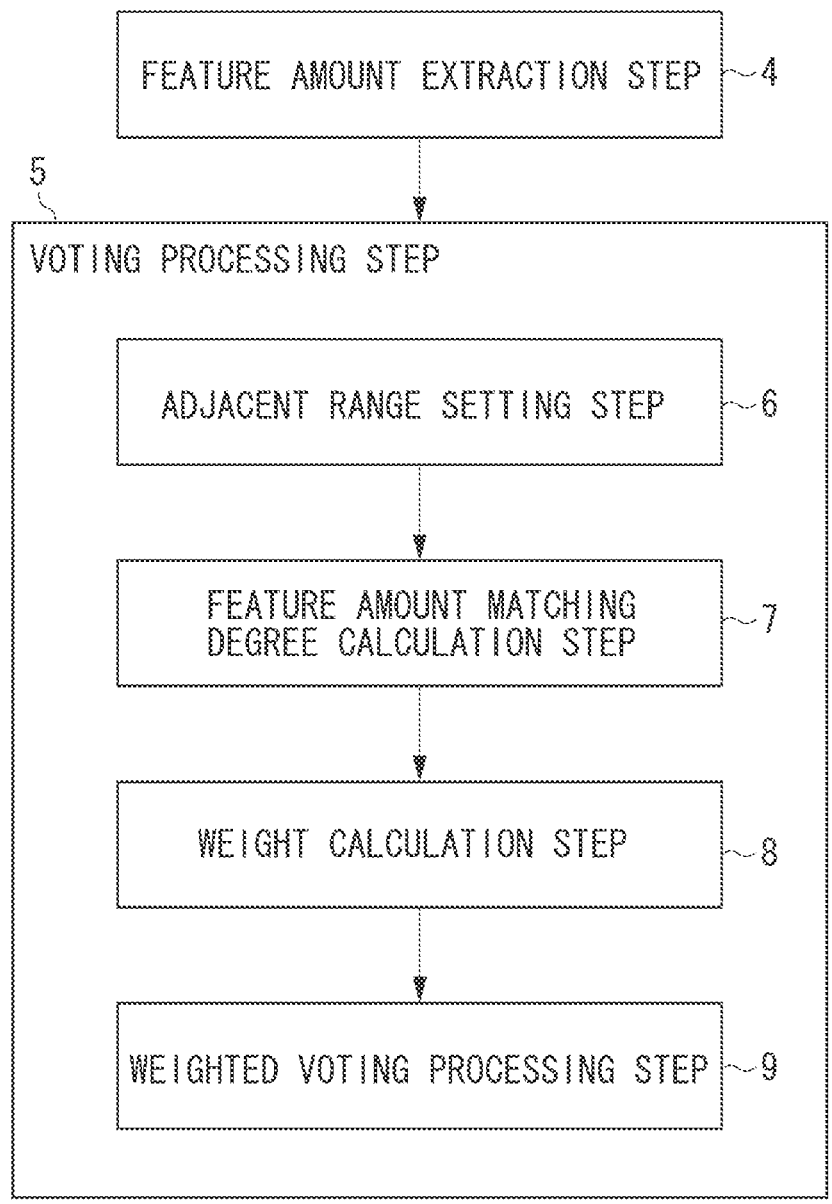
FIG. 2 is a flowchart illustrating a procedure of pattern recognition processing according to an exemplary embodiment.

FIG. 2 illustrates a flowchart illustrating a procedure of the pattern recognition processing.

As illustrated in FIG. 2, the pattern recognition apparatus according to the present exemplary embodiment includes a feature amount extraction step 4 and a voting processing step 5.

The voting processing step 5 includes an adjacent range setting step 6, a feature amount matching degree calculation step 7, a weight calculation step 8, and a weighted voting processing step 9. The above-described steps 4 to 9 are performed by a feature amount extraction unit, a voting processing unit, an adjacent range setting unit, a feature amount matching degree calculation unit, a weight calculation unit, and a weighted voting processing unit of the pattern recognition apparatus according to the present exemplary embodiment, respectively.

Next, each of the processing steps will be described.

In the feature amount extraction step 4, the pattern recognition apparatus performs feature amount extraction processing on a distance image input from the distance image capturing apparatus 1. As employed herein, a distance image refers to an image in which, as illustrated in FIG. 3, distance information from the distance image capturing apparatus 1 to an object 3 is stored in each pixel.

Figure 3:
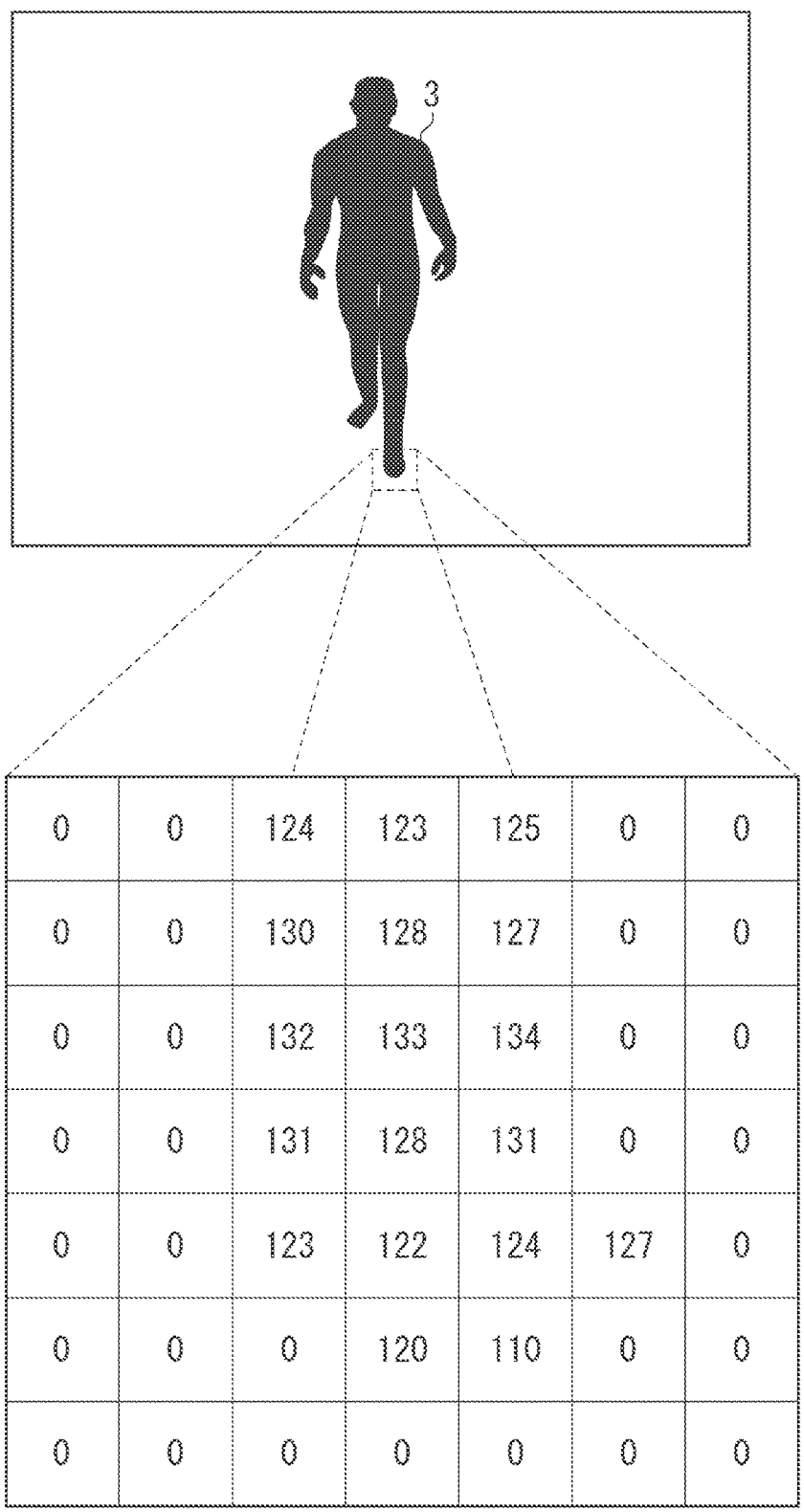
FIG. 3 is a diagram illustrating an example of a distance image according to a first exemplary embodiment.

For example, in FIG. 3, a distance image is captured to include a person as an object 3. Each pixel stores distance information from the distance image capturing apparatus 1 to the object 3. In FIG. 3, the distance information is expressed by integer values of 8-bit gradation.

In the present exemplary embodiment, the distance image input to the feature amount extraction step 4 contains distance information only about a human area. Other pixels corresponding to the background do not store distance information. For example, a pixel value of 0 is set to such pixels.

Examples of a method for identifying the human area from the distance image input to the feature amount extraction step 4 may include a technique for assuming all pixels having a predetermined distance value or larger to be a background object in a situation where the imaging environment is limited. However, the present disclosure is not particularly limited to such a technique. The distance image to be processed is not necessarily limited to the one having distance information only in a human area, either. The example with the distance information existing only in the human area is described solely for the purpose of facilitating understanding of the description of the subsequent processing.

The feature amount extraction processing according to the present exemplary embodiment is performed in the following manner.

The pattern recognition apparatus according to the present exemplary embodiment defines a string of k reference pixel pairs as a query, and performs recognition of an object based on feature amount data obtained by applying the query to each pixel of the input distance image (k is a natural number).

Figure 4:
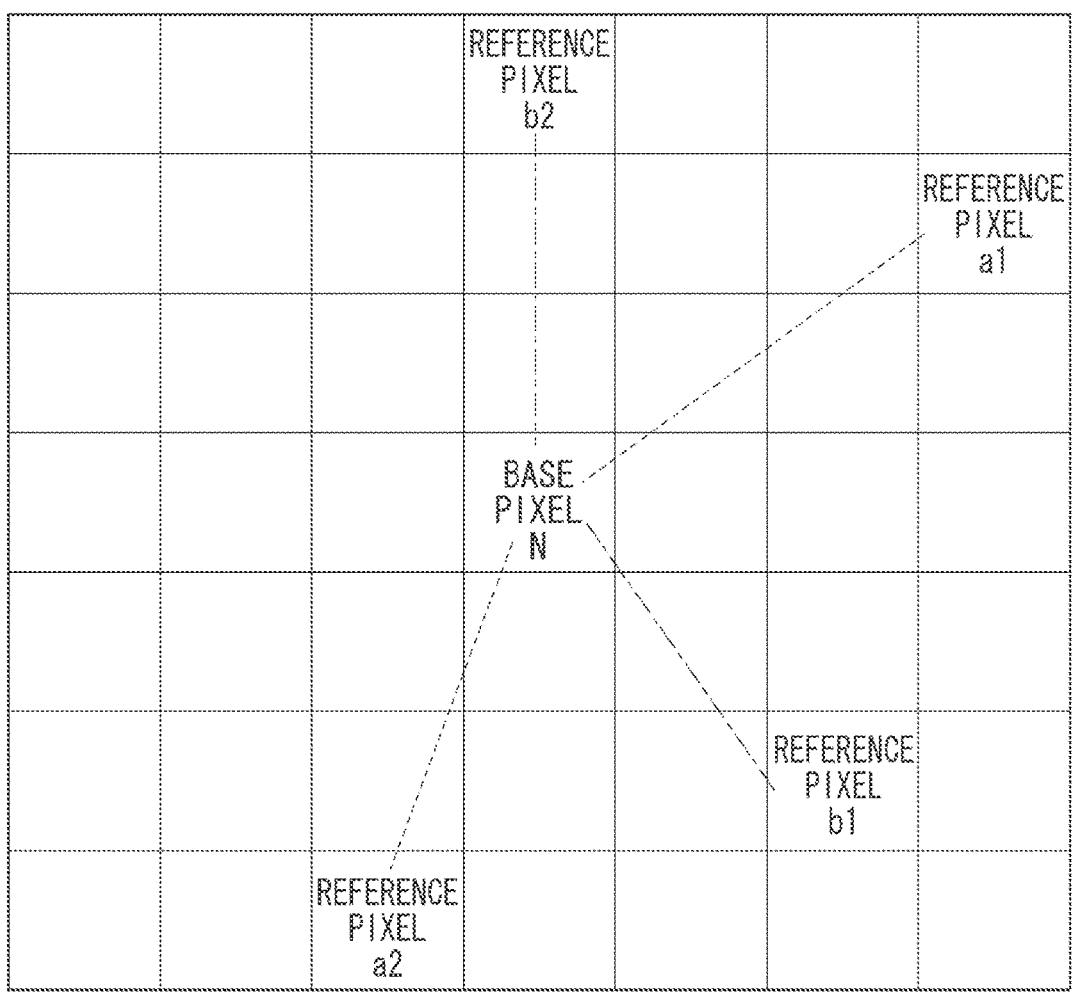
FIG. 4 is a diagram illustrating an example of reference pixels according to the first exemplary embodiment.

Initially, the pattern recognition apparatus compares the magnitudes of distance values at two reference pixels defined by relative positions in advance for each pixel (base pixel) of the input distance image. For example, suppose that as illustrated in FIG. 4, the relative positions of reference pixels are set such that a reference pixel a1 is in (3, 2) and a reference pixel a2 is in (−1, −3). The pattern recognition apparatus compares the distance values of the reference pixels a1 and a2 with respect to a base pixel N. In FIG. 4, the reference pixels a1 and a2 are illustrated as connected with the base pixel N by dotted lines.

Suppose that pixel values of the reference pixels a1 and a2 have distance values of 140 and 37 in 8-bit gradation, respectively. The relationship in magnitude between the distance values is expressed as Formula (1):

$$a1 > a2 \quad \text{Formula (1)}$$

A method for setting a feature amount based on the comparison result will be described. If the first reference pixel has a distance value greater than that of the second reference pixel (here, a1>a2), the pattern recognition apparatus assigns 1 to the most significant bit (MSB) of the feature amount which is expressed by a bit code string. On the other hand, if the first reference pixel has a distance value smaller than that of the second reference pixel (here, a1<a2), the pattern recognition apparatus assigns 0 to the MSB. From Formula (1), a bit code calculated from the reference pixels a1 and a2 here is 1.

The pattern recognition apparatus further compares the distance values of a reference pixel b1 at (2, −3) and a reference pixel b2 at (0, 3) with respect to the same base pixel N.

In FIG. 4, the reference pixels b1 and b2 are illustrated as being connected with the base pixel N by dashed-dotted lines. Suppose that the relationship in magnitude between the reference pixels b1 and b2 is expressed as Formula (2):

$$b1 < b2 \quad \text{Formula (2)}$$

In such a case, a bit code of 0 is assigned to the second bit of the feature amount expressed by the bit code string.

In such a manner, the pattern recognition apparatus performs the calculation of the bit code string based on the relationship in magnitude between the reference pixel pairs set as a query. For example, in the present exemplary embodiment, the pattern recognition apparatus performs the calculation on six reference pixel pairs. As a result, a 6-bit bit code string serving as a feature amount can be obtained pixel by pixel.

It will be understood that the number of reference pixel pairs (i.e., the length of the bit code string) is not limited to six and may be freely set according to the object to be recognized and recognition accuracy needed. In the present exemplary embodiment, the number of reference pixel pairs is set to six for the sake of facilitating the following description.

In the present exemplary embodiment, the reference pixel pairs serving as a query are assumed to be selected at random from among pixels around the base pixel N. However, other techniques may be used as needed basis. For example, the area of pixels from which to select may be limited. The present disclosure is not intended to limit the method for selecting the reference pixel pairs.

Such processing for extracting a feature amount expressed by a bit code string with respect to a pixel is performed on all the pixels in the distance image.

As described above, in the present exemplary embodiment, only the pixels belonging to the human area have distance information, and the pattern recognition apparatus performs the processing for extracting a feature amount only on the pixels belonging to the human area. As a result, a 6-bit feature amount is calculated on each pixel belonging to the human area.

FIG. 5 illustrates some of the feature amounts calculated pixel by pixel.

Data obtained by associating the calculated feature amounts with the respective pixels will be referred to as a feature amount image.

Next, the feature amount image calculated as described above is input to the voting processing step 5 of FIG. 2. In the voting processing step 5, the pattern recognition apparatus refers to a dictionary created in advance and performs voting processing. Information stored in the dictionary will first be described with reference to FIG. 6.

As illustrated in FIG. 6, the dictionary according to the present exemplary embodiment includes information about objects to be recognized to be voted for with respect to all possible patterns of a feature amount (6-bit code string). The dictionary originally includes information about all of 12 types of intended joints to be described below. To avoid complication of the diagram, FIG. 6 illustrates only information about three types of joints. FIG. 6 also illustrates only some of possible feature amounts since all the patterns of the feature amount are hard to illustrate.

In the present exemplary embodiment, the objects to be recognized are joint positions of a human body. For each joint of the human body, frequency values and average relative position vectors to voting destinations (joint positions) are stored as the information about the voting destinations. For the sake of understanding of the information about the voting destinations, a process for generating the dictionary will be described.

Figure 7:
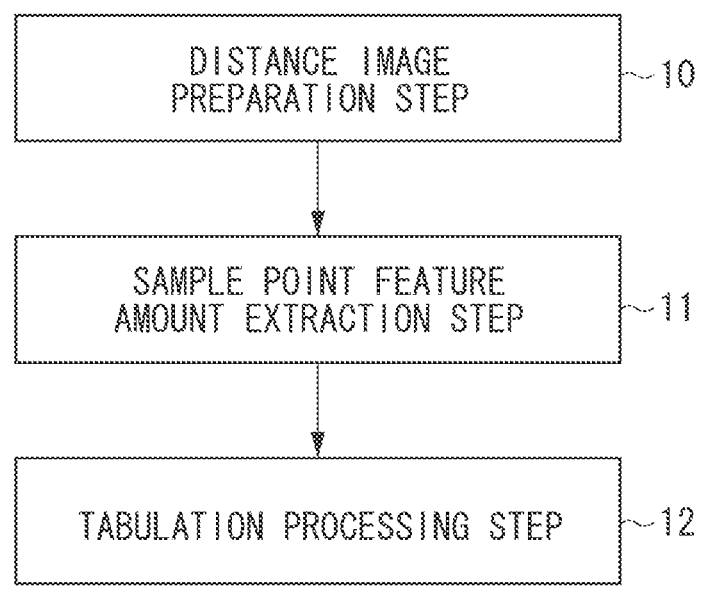
FIG. 7 is a flowchart illustrating a procedure of a generation process of the dictionary according to the first exemplary embodiment.

FIG. 7 is a flowchart illustrating a procedure of the process for generating the dictionary.

As illustrated in FIG. 7, in a distance image preparation step 10, the user first prepares a plurality of distance images including a human body. In the present exemplary embodiment, the user prepares 100 distance images. In each distance image, the center positions of the joints of a human body serving as the objects to be recognized are known in advance on a predetermined coordinate system.

In the present exemplary embodiment, the joints of a human body serving as the objects to be recognized include 12 types of joints which are the "neck, left shoulder, right shoulder, left elbow, right elbow, left wrist, right wrist, waist, left knee, right knee, left angle, and right ankle."

Next, the pattern recognition apparatus performs a sample point feature amount extraction step 11 illustrated in FIG. 7 with the above-described distance images as input patterns. In the sample point feature amount extraction step 11, the pattern recognition apparatus performs almost the same processing as that of the feature amount extraction step 4 of FIG. 2 described above. A difference lies in that the processing for extracting the feature amount of a pixel is not performed on all the pixels belonging to a human body area, but on only pixels extracted at random from among the pixels belonging to the human body area.

In the present exemplary embodiment, the pattern recognition apparatus extracts 100 pixels as base pixels at random from among the pixels belonging to the human body area in each distance image, and performs the feature amount extraction processing. As a result, a total of 10,000 base pixels are extracted from the 100 distance images, and the feature amounts of the respective base pixels are determined.

Next, in a tabulation processing step 12 of FIG. 7, the pattern recognition apparatus tabulates base pixels of which the same feature amounts (i.e., the same bit code strings) are calculated based on the bit code strings of the feature amounts determined as described above. When tabulating base pixels by the same feature amount, the pattern recognition apparatus calculates a relative position vector that is vector data to a joint position closest to the position of the base pixel.

More specifically, the distance images including the base pixels include joint center position coordinate information about a human body as described above. The pattern recognition apparatus can thus calculate a relative position vector to corresponding joint center position coordinates from position coordinates of the base pixels. At the same time, the pattern recognition apparatus adds 1 to the frequency value (see FIG. 6) related to the closest joint of which the relative position vector is calculated.

The pattern recognition apparatus performs such processing on all the base pixels having the same feature amounts. The pattern recognition apparatus thereby determines, for each of the joints of the base pixels having the same feature amounts, the frequency value calculated as described above and an average relative position vector which is obtained by averaging the relative position vectors calculated as described above for the same joint. By performing the above-described processing on all the feature amounts (bit code strings), the pattern recognition apparatus can obtain data on the average relative position vectors and the frequency values of the respective joints for the respective feature amounts.

For example, as illustrated in FIG. 6, the pattern recognition apparatus thus generates a dictionary in which the average relative position vectors and the frequency values of the respective joints are associated with each other for each feature amount (bit code string). In other words, the information stored in the dictionary means that the pixels having the respective feature amounts in a distance image are likely to be in the vicinity of the joints having the respective frequency values, and the relative positions to the joint centers are expressed by the average relative position vectors.

The bit code stings corresponding to the feature amounts are calculated from the relationship in magnitude between the reference point pairs in the distance images. Consequently, if base pixels lie near the same joint center position without much difference in the distribution of the distance values of peripheral pixels, the calculated bit code strings can be expected to have similar values.

The method for generating the dictionary in advance has been described above.

Next, the voting processing step 5 of FIG. 2 will be described.

In the voting processing step 5, the pattern recognition apparatus refers to the dictionary for each pixel position on a human area and performs voting processing on a corresponding joint based on the feature amount image calculated in the feature amount extraction step 4. At that time, the pattern recognition apparatus refers to a degree of matching between the feature amount of a base pixel and the feature amounts of spatially adjacent pixels.

The processing flow of the voting processing step 5 will be described in detail below.

First, in the adjacent range setting step 6 of the voting processing step 5, the pattern recognition apparatus sets the range of spatially adjacent pixel positions with respect to each pixel based on a characteristic of the object to be recognized.

In the present exemplary embodiment, as the characteristic of the object to be recognized, the pattern recognition apparatus refers to the length of the average relative position vector of each joint stored in the above-described dictionary corresponding to the feature amount calculated for each pixel.

Figure 9:
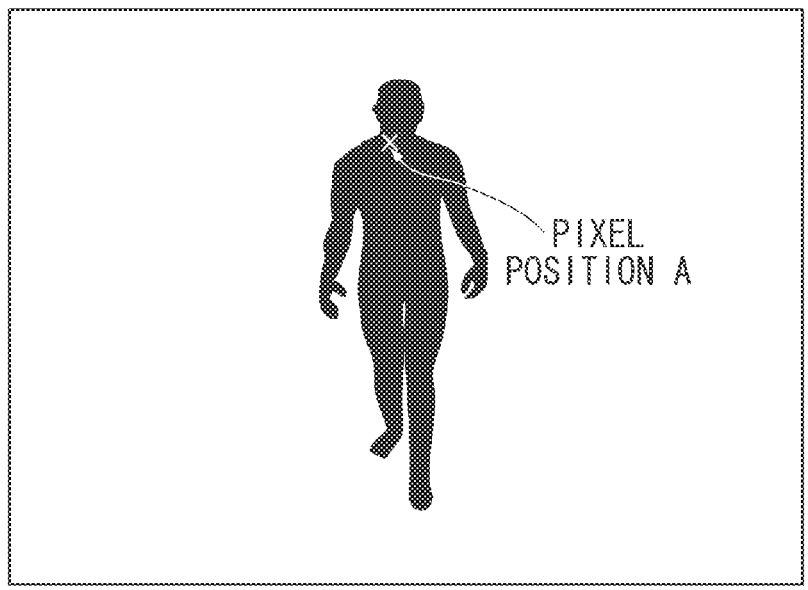
FIG. 9 is a diagram illustrating an example of a pixel position according to the first exemplary embodiment.

For example, suppose that the average relative position vector to the center of the neck joint, obtained by referring to the dictionary for the feature amount calculated in a pixel position A illustrated in FIG. 9, has a length of Ln. Suppose also that two types of thresholds (θna, θnb) are prepared in advance. The pattern recognition apparatus performs comparison processing with Ln as expressed by the following Formulas (3) to (5):

$$0 < Ln \leq \theta na, \qquad \text{Formula (3)}$$

$$\theta na < Ln \leq \theta nb, \text{ and} \qquad \text{Formula (4)}$$

$$\theta nb < Ln. \qquad \text{Formula (5)}$$

Figure 8:
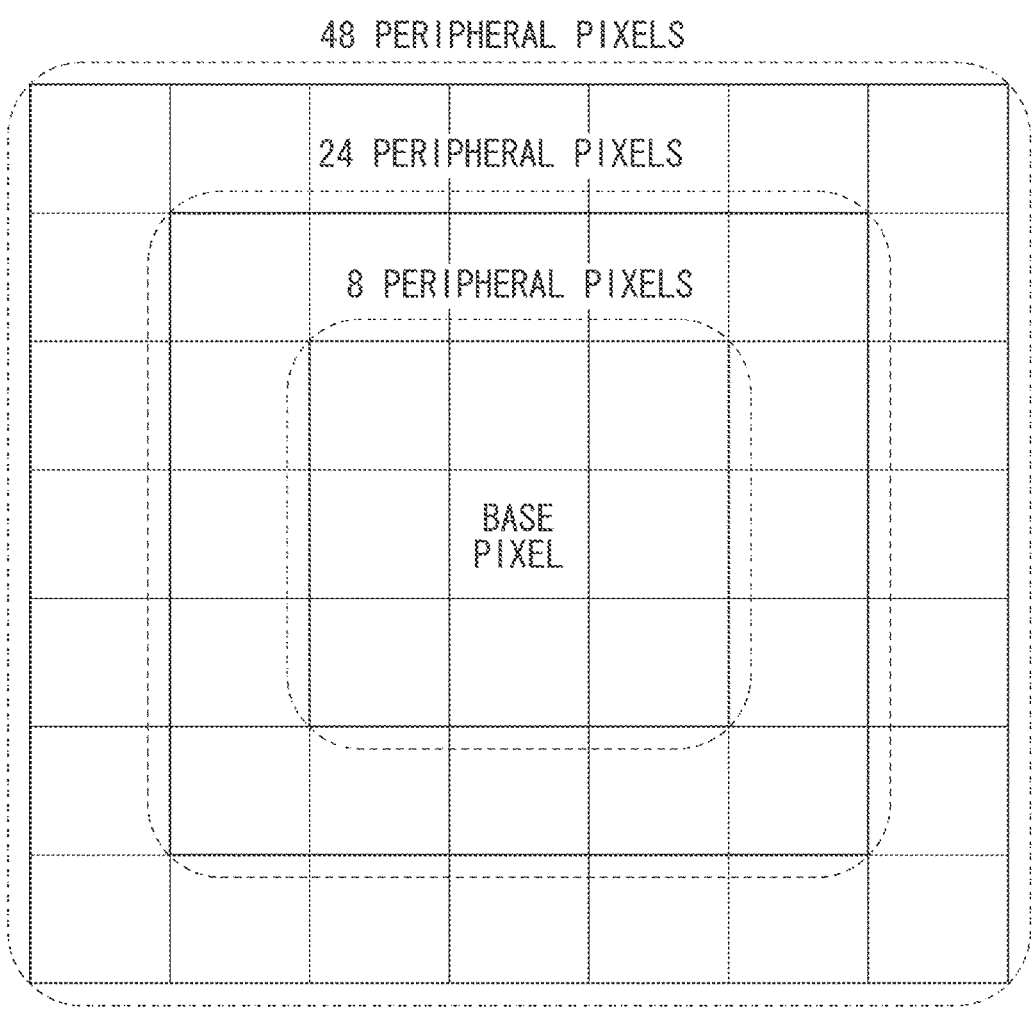
FIG. 8 is a diagram illustrating ranges of spatially adjacent pixel positions according to the first exemplary embodiment.

If the result of the comparison processing satisfies Formula (3), the pattern recognition apparatus sets the range of spatially adjacent pixel positions to the range of 48 peripheral pixels illustrated in FIG. 8. If the result of the comparison processing satisfies Formula (4), the pattern recognition apparatus sets the range of spatially adjacent pixel positions to the range of 24 peripheral pixels illustrated in FIG. 8. If the result of the comparison processing satisfies Formula (5), the pattern recognition apparatus sets the range of spatially adjacent pixel positions to the range of eight peripheral pixels illustrated in FIG. 8.

In the present exemplary embodiment, the ranges of spatially adjacent pixel positions are set as two-dimensional image area ranges. The ranges of pixel positions each exclude the base pixel located at the center. For example, if the value of Ln is 20 and the values of the thresholds (θna, θnb) are (10, 30), the result of the comparison processing satisfies Formula (4). In such a case, the range of spatially adjacent pixel positions is set to 24 peripheral pixels.

The pattern recognition apparatus performs the above-described processing on all the intended joints to be voted for, obtained by referring to the dictionary. The pattern recognition apparatus thereby sets the range of spatially adjacent pixel positions for each joint.

The above-described method for setting the range of pixel positions based on the length Ln of the average relative position vector is just an example. Other setting methods may be used.

For example, the thresholds are not limited to two types. The ranges of spatially adjacent pixel positions may include other types and ranges of settings. The thresholds may have different values for different joints.

Instead of setting the range of pixel positions by using the thresholds as described above, a function using the length Ln of the average relative position vector as a variable may be set in advance to calculate the range of pixel positions.

In the present exemplary embodiment, the adjacent range setting step 6 includes calculating the length Ln of the average relative position vector and performing the comparison processing based on the thresholds. However, the ranges of spatially adjacent pixel positions may be written in the dictionary in advance. In such a case, the dictionary increases in size, whereas the reduced amount of processing in the adjacent range setting step 6 can reduce the execution time of the pattern recognition processing.

In the above-described example, the length Ln of the average relative position vector is assumed to be calculated as the length of a three-dimensional vector. Instead, the pattern recognition apparatus may calculate a length Ln only from x and y components of the average relative position vector on the distance image. The pattern recognition apparatus may then set the range of pixel positions based on the above-described comparative expressions of Formulas (3) to (5).

In the above-described example, the length Ln of the average relative position vector is assumed to be calculated as the length of a three-dimensional vector. In such a case, the pattern recognition apparatus may add distance information in each pixel position to the range of spatially adjacent pixel positions. The pattern recognition apparatus may then specify the range of pixel positions included in a spherical area around the position of the base pixel on the above-described predetermined coordinate system. For example, like the above-described Formulas (3) to (5), two types of thresholds (θna, θnb) may be prepared in advance to perform comparison processing with the length Ln of the average relative position vector:

$0 < Ln \leq \theta na \rightarrow$ pixels belonging to the inside of a sphere having a radius of $R1$ around the position of the base pixel, Formula (6)

$\theta na < Ln \leq \theta nb \rightarrow$ pixels belonging to the inside of a sphere having a radius of $R2$ around the position of the base pixel, and Formula (7)

$\theta nb < Ln \leq \rightarrow$ pixels belonging to the inside of a sphere having a radius of $R3$ around the position of the base pixel. Formula (8)

If the result of the comparison processing satisfies Formula (6), the pattern recognition apparatus sets the range of spatially adjacent pixel positions to the range of pixels belonging to the inside of the sphere having a radius of R1 around the position of the base pixel.

If the result of the comparison processing satisfies Formula (7), the pattern recognition apparatus sets the range of spatially adjacent pixel positions to the range of pixels belonging to the inside of the sphere having a radius of R2 around the position of the base pixel.

If the result of the comparison processing satisfies Formula (8), the pattern recognition apparatus sets the range of spatially adjacent pixel positions to the range of pixels belonging to the inside of the sphere having a radius of R3 around the position of the base pixel.

Here, R1, R2, and R3 have a size relationship expressed by the following Formula (18):

$R1 > R2 > R3$. Formula (18)

In the above description, the pattern recognition apparatus sets the range of spatially adjacent pixel positions based on the length Ln of the average relative position vector. The pattern recognition apparatus may further refer to a direction of the average relative position vector. In such a case, the pattern recognition apparatus sets the range of spatially adjacent pixel positions to, for example, pixels included in a peripheral area along the average relative position vector. In such a case, the range of spatially adjacent pixel positions is set so that the distances between the average relative position vector and the pixel positions are smaller than or equal to a predetermined threshold. The method for setting the range of spatially adjacent pixel positions by referring to the direction of the average relative position vector is not limited thereto. Other methods may be used.

Next, the feature amount matching degree calculation step 7 illustrated in FIG. 2 will be described.

In the feature amount matching degree calculation step 7, the pattern recognition apparatus calculates a feature amount matching degree based on adjacent pixel position range information about each joint, determined for each pixel position as described above. As an example, a case of calculating the feature amount matching degree about the neck joint in the pixel position A illustrated in FIG. 9 will be described.

Suppose that the range of pixel positions to refer to in the pixel position A is set to 24 peripheral pixels in the adjacent range setting step 6. In such a case, in the feature amount matching degree calculation step 7 according to the present exemplary embodiment, the pattern recognition apparatus calculates the reciprocal of a value obtained by adding 1 to an average value of Hamming distances H between the feature amount in the pixel position A and the respective feature amounts of the 24 peripheral pixels as a feature amount matching degree Mn. A formula for calculating the feature amount matching degree Mn is given by Formula (9):

$Mn = 1/(\Sigma H/24 + 1)$. Formula (9)

For example, suppose that the feature amount in the pixel position A and those of the 24 peripheral pixels have been calculated as illustrated in FIG. 10A. FIG. 10B illustrates the Hamming distances H between the pixel position A and the respective 24 peripheral pixels. The Hamming distances H are written in the positions of the respective 24 peripheral pixels.

As a result, based on Formula (9), the feature amount matching degree Mn is calculated by the following Formula (10):

$Mn = 1/((2+1+1+2+1+1+0+0+0+2+2+0+1+1+1+1+1+ 0+1+2+1+1+1+1)/24+1) = 0.5$. Formula (10)

In the above-described example, the feature amount matching degree Mn is calculated by using the Hamming distance H. Alternatively, distance indexes such as the Euclidean distance and the Manhattan distance may be used. The method for calculating the feature amount matching degree Mn is not limited to those described above. For example, a correlation coefficient C between feature amounts may be used.

In such a case, the feature amount matching degree Mn is calculated by the following Formula (11):

$Mn = 1/(\Sigma C/24 + 1)$. Formula (11)

Next, the weight calculation step 8 illustrated in FIG. 2 will be described.

In the weight calculation step 8, the pattern recognition apparatus calculates a weighting amount to be used in the weighted voting processing step 9 to be described below based on the feature amount matching degree Mn described above.

For example, in the present exemplary embodiment, the pattern recognition apparatus sets the feature amount matching degrees Mn calculated in the feature amount matching degree calculation step 7 as weighting amounts Wn for the respective joints in the respective pixel positions. More specifically, a formula for calculating the weighting amount Wn is expressed by the following Formula (12):

$$Wn = Mn. \quad \text{Formula (12)}$$

Such a method for calculating the weighting amount Wn is just an example, and other methods may be used. For example, instead of simply setting the feature amount matching degree Mn, a function using the feature amount matching degree Mn as a variable may be set in advance to calculate the weighting amount Wn.

Next, the weighted voting processing step 9 illustrated in FIG. 2 will be described.

For example, suppose that the feature amount in the pixel position A is 011010, and the frequency values and average relative position vectors of the respective joints corresponding to the feature amount are obtained as listed below by referring to the dictionary.

Suppose that the joints to be voted for corresponding to the feature amount are only the following four types:
Left elbow: a frequency value of h1 and an average relative position vector of (x1, y1, z1)
Right elbow: a frequency value of h2 and an average relative position vector of (x2, y2, z2)
Left knee: a frequency value of h3 and an average relative position vector of (x3, y3, z3)
Right knee: a frequency value of h4 and an average relative position vector of (x4, y4, z4)

Then, the pattern recognition apparatus multiplies the frequency values h1, h2, h3, and h4 by respective weighting amounts WLe (left elbow), WRe (right elbow), WLk (left knee), and WRk (right knee) which are calculated in the pixel position A for the above-described respective four types of joints in the weight calculation step 8. The pattern recognition apparatus further adds the average relative position vectors (x1, y1, z1), (x2, y2, z2), (x3, y3, z3), and (x4, y4, z4) to the coordinate position of the pixel position A in the predetermined coordinate system to calculate existence candidate position coordinates of the respective joint centers.

Now, the meaning of the weighting to the frequency values will be described.

As described above, a bit code string corresponding to a feature amount is calculated from the relationship in magnitude between reference point pairs in a distance image. Bit code stings calculated at pixels therefore have similar values if their peripheral pixels do not have much difference in the distribution of distance values. Therefore, feature amounts calculated at pixels in the periphery of a joint in a distance image are expected to vary gently.

In contrast, if a feature amount (bit code string) significantly different from those of peripheral pixels is calculated in a certain pixel position, the feature amount is likely to contain an error due to noise present in the distance image. Thus, a vote based on the feature amount calculated in such a pixel position has low reliability.

In the present exemplary embodiment, the pattern recognition apparatus then calculates the degree of matching of the feature amount with peripheral pixels. If the degree of matching is high, the pattern recognition apparatus sets a large weighting amount to a vote from that pixel. On the other hand, if the degree of matching is low, the pattern recognition apparatus sets a small weighting amount to a vote from that pixel. The purpose is to prevent degradation of the voting result due to noise. The pattern recognition apparatus characteristically makes the range, in which the degree of matching of the feature amount is calculated, variable according to the characteristic of the object to be recognized.

More specifically, if the length Ln of the average relative position vector serving as the characteristic of the object to be recognized is small, it means that the pixel position is located near a joint serving as a voting destination. Accordingly, pixels having similar feature amounts can be expected to be present over a wide range around the pixel.

In the present exemplary embodiment, the smaller the length Ln of the average relative position vector is, the wider the pattern recognition apparatus makes the range in which the feature amount matching degree Mn is calculated. In such a manner, the pattern recognition apparatus adjusts the range where feature amounts are supposed to be similar.

As a result, the pattern recognition apparatus can calculate the feature amount matching degree Mn in a more appropriate pixel range, and can thus correctly calculate the weighting amount to a vote.

The pattern recognition apparatus performs the above-described processing on all the pixels belonging to the human area in the feature amount image, whereby the existence candidate position coordinates of the joint center positions and the corresponding distributions of weighted frequency values are obtained joint by joint.

In the weighted voting processing step 9, the pattern recognition apparatus further calculates a final joint position center position from the distribution of the weighted frequency values obtained for each joint as described above, by using a cluster center selection technique such as "mean shift". For example, "mean shift" based cluster center selection processing is discussed in detail in Y. Cheng, "Mean shift, mode seeking, and clustering," IEEE Trans. Pattern Anal. And Machine Intell., Vol. 17, No. 8, pp. 790-799 (1995). A detailed description thereof will thus be omitted.

The method for calculating a joint position center position from the distribution of weighted frequency values obtained for each joint is not limited to the "mean shift". For example, techniques using k-means clustering may be used. Other techniques that can calculate a cluster center from a distributive data group may be used.

In the present exemplary embodiment, in the weighted voting processing step 9, the pattern recognition apparatus performs the voting of the joint center positions with respect to coordinate positions having continuous values. However, other methods that can calculate the distribution of positions where an object to be recognized exists may be used.

For example, the pattern recognition apparatus may perform processing for rounding the coordinate positions to be voted for into integer values, and when voting for the same coordinate position in the joint-by-joint weighted voting processing, accumulate the weighted frequency values.

In the present exemplary embodiment, the pattern recognition apparatus uses the cluster center selection technique to calculate a final joint position center position from the distribution of weighted frequency values obtained for each joint. In other examples, the pattern recognition apparatus may calculate a total sum of the distribution of weighted frequency values obtained for each joint, divide the distribution of weighted frequency values by the total sum to determine a probability distribution, and calculate a final joint position center position by using an appropriate cluster center selection technique.

In the present exemplary embodiment, in the voting processing step 5, the pattern recognition apparatus votes for a voting space by using a frequency value joint by joint. However, the pattern recognition apparatus may votes by using a probability value joint by joint. For example, as illustrated in FIG. 11, the pattern recognition apparatus may generate a dictionary in which existence probabilities indicating near which joints reference pixels in a distance image corresponding to each feature amount are present are stored in the form of probability values as the information about the voting destinations corresponding to the feature amount.

More specifically, in the dictionary containing the frequency values illustrated in FIG. 6, the pattern recognition apparatus can calculate the total sum of the frequency values of a feature amount and divide the frequency values corresponding to the respective joints by the total sum to calculate the probability values of the joints illustrated in FIG. 11.

In the present exemplary embodiment, a distance image is assumed as an input pattern. However, a luminance image in which each pixel has a luminance value may be used. In such a case, the pattern recognition apparatus can perform processing similar to the above-described processing except that the feature amount extraction processing compares the luminance values of the reference pixel pairs and that the setting of the comparison range of the feature amount matching degree Mn is limited to two-dimensional space (for example, the range expressed by Formulas (3) to (5)).

If a luminance image is used as an input pattern, the pattern recognition apparatus may effectively perform preprocessing such as edge detection processing before the feature amount extraction step 4.

The technique for calculating a feature amount expressed by a bit code string such as described in the present exemplary embodiment is not limited to the comparison of two reference pixels.

For example, a base pixel itself and a reference pixel may be compared instead of two reference pixels. Other techniques may be used. The feature amount itself is not limited to a bit code string such as that described in the present exemplary embodiment. Other feature amounts may be used as long as a degree of matching can be calculated between the feature amounts.

For example, if a luminance image is used as an input pattern, a speeded-up robust features (SURF) feature amount may be calculated in each pixel position. A SURF feature amount is a feature amount expressed by a 128-dimensional vector. The degree of matching with the feature amount can be calculated by using a correlation coefficient or the Euclidean or Manhattan distance described above. The SURF feature amount is discussed in detail in H. Bay, "Speeded-Up Robust Features (SURF)," Computing Vision and Image Understanding, Vol. 110 (3) June 2008, pp. 346-359. A detailed description thereof will thus be omitted.

As described above, according to the present exemplary embodiment, the pattern recognition apparatus calculates a feature amount matching degree Mn between a base pixel and peripheral pixels. If the feature amount matching degree Mn is high, the pattern recognition apparatus sets a large weighting amount to a vote from that pixel. If the feature amount matching degree Mn is low, the pattern recognition apparatus sets a small weighting amount. In such a manner, degradation of a voting result due to noise can be prevented.

In particular, the range in which the feature amount matching degree Mn is calculated is made variable according to the length Ln of the average relative position vector for each joint, the length L serving as a characteristic of the object to be recognized. The pattern recognition apparatus can thus calculate the feature amount matching degree Mn in an appropriate pixel range. As a result, the above-described weighting amount to a vote can be correctly calculated.

A second exemplary embodiment of the present disclosure will be described below with reference to the drawings.

A pattern recognition apparatus according to the present exemplary embodiment differs from the voting processing step 5 according to the first exemplary embodiment in the processing of the adjacent range setting step 6. Accordingly, the present exemplary embodiment will thus be described in only respects specific to the present exemplary embodiment, and a description of the contents described in the first exemplary embodiment will be omitted.

In the voting processing step 5 according to the present exemplary embodiment, the pattern recognition apparatus refers to the dictionary for each pixel position on the human area and performs voting processing on corresponding joints based on the feature amount image calculated in the feature amount extraction step 4. At that time, the pattern recognition apparatus refers to a degree of matching between the feature amount of a base pixel and the feature amount(s) of a temporally adjacent pixel or pixels.

Figure 12:
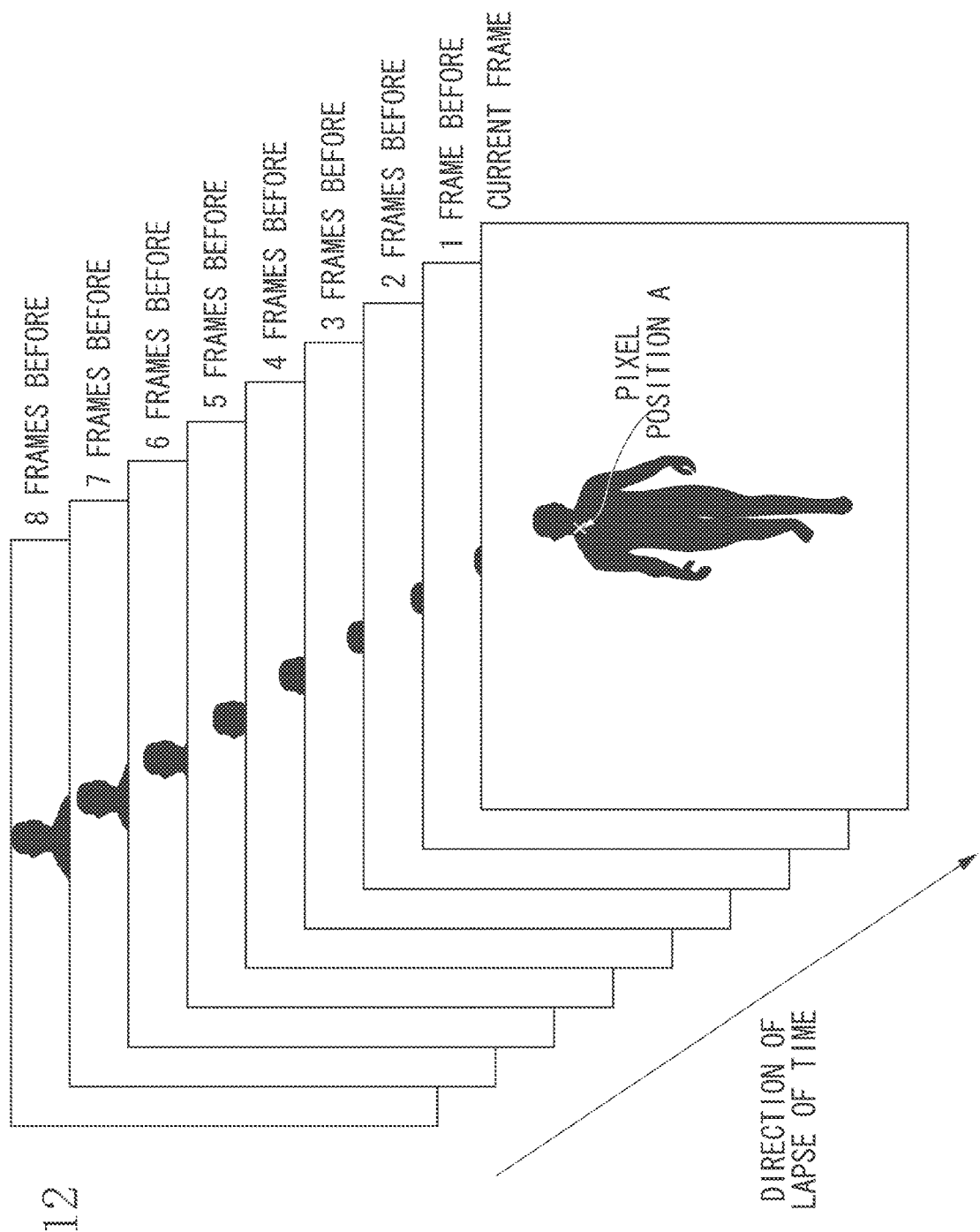
FIG. 12 is a diagram illustrating an example of distance image frames according to a second exemplary embodiment.

As employed herein, a temporally adjacent pixel refers to a pixel located in the same position in a distance image frame obtained in a predetermined time length before the distance image to which the base pixel belongs. For example, as illustrated in FIG. 12, suppose that distance images are obtained at a predetermined frame rate. With respect to a base pixel to be processed, the pixels that are included in distance images up to n frames before (n is a natural number) and located in the same positions on the images are defined as temporally adjacent pixels.

In the voting processing step 5 according to the present exemplary embodiment, in the adjacent range setting step 6, the pattern recognition apparatus firstly sets the range of temporary adjacent pixel positions for each pixel based on a characteristic of the object to be recognized. In the present exemplary embodiment, the pattern recognition apparatus refers to the magnitude of a velocity vector calculated for each pixel as the characteristic of the object to be recognized.

In the present exemplary embodiment, the velocity vector for each pixel is calculated based on a method for calculating an optical flow in the adjacent range setting step 6. However, the calculation may be completed before the adjacent range setting step 6. For example, the pattern recognition apparatus may perform the calculation in parallel with the feature amount extraction step 4.

A method for calculating an optical flow is discussed in detail in B. K. P. Horn and B. G. Schunck, "Determining Optical Flow", Artificial Intelligence, vol. 17, pp. 185-203, 1981. A detailed description thereof will thus be omitted. Further, a calculation method other than that of an optical flow may be used as long as the velocity vector for each pixel can be calculated.

Now, suppose that the velocity vector calculated in the pixel position A has a magnitude of V. With two types of thresholds ($\theta va$, $\theta vb$) prepared in advance, the pattern recognition apparatus performs comparison processing with V as expressed by the following Formulas (13) to (15):

$$0 < V \leq \theta va \rightarrow \text{up to eight frames before,} \qquad \text{Formula (13)}$$

$$\theta va < V \leq \theta vb \rightarrow \text{up to four frames before, and} \qquad \text{Formula (14)}$$

$$\theta vb < V \rightarrow \text{up to one frame before.} \qquad \text{Formula (15)}$$

Figure 13:
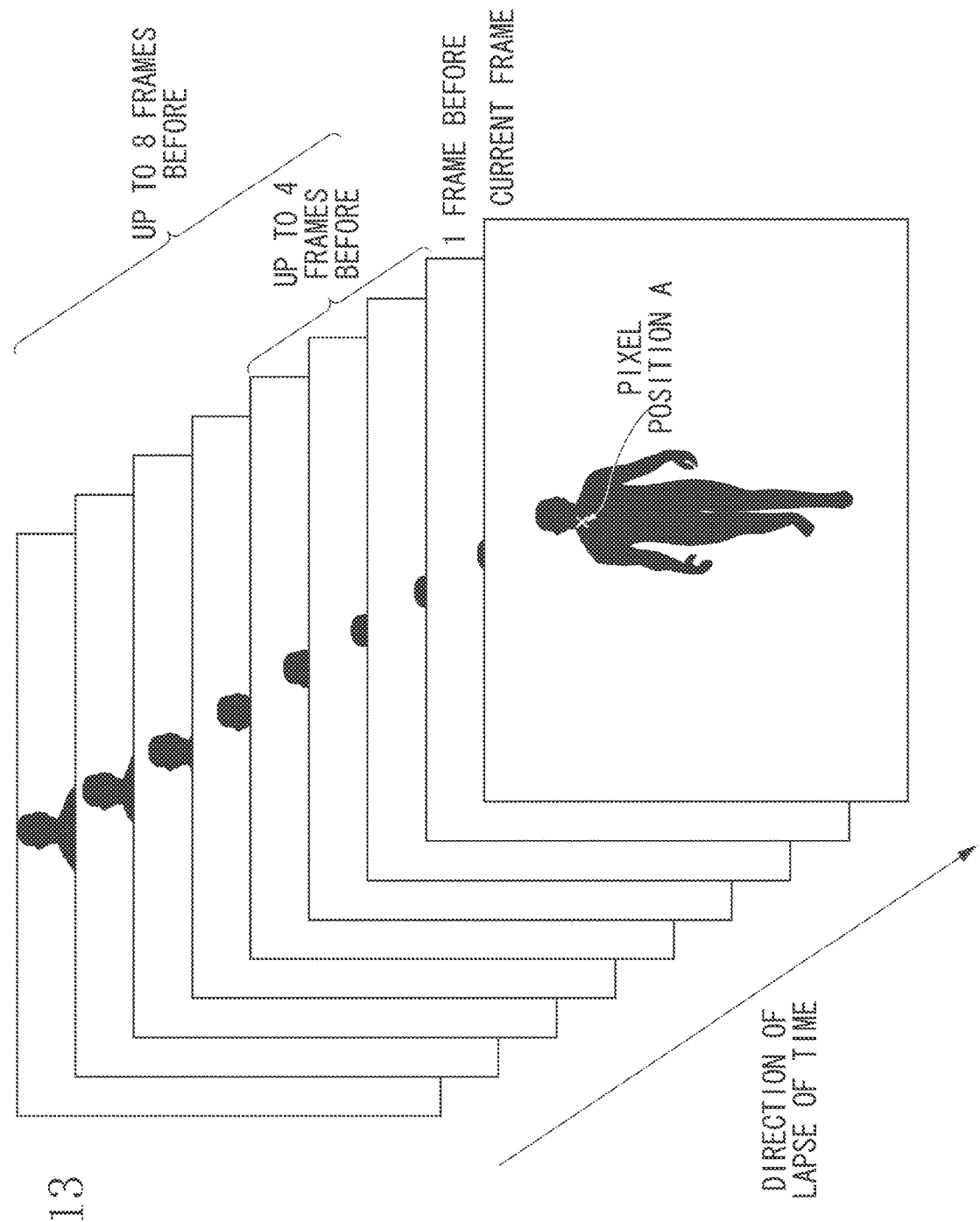
FIG. 13 is a diagram illustrating frame ranges according to the second exemplary embodiment.

If the result of the comparison processing satisfies Formula (13), the pattern recognition apparatus sets a frame range of temporally adjacent pixels to the range of up to eight frames before illustrated in FIG. 13. If the result of the comparison processing satisfies Formula (14), the pattern recognition apparatus set the frame range of temporally adjacent pixels to the range of up to four frames before illustrated in FIG. 13. If the result of the comparison processing satisfies Formula (15), the pattern recognition apparatus sets the frame range of temporally adjacent pixels to the range of up to one frame before illustrated in FIG. 13.

For example, if the value of V is 10 and the values of the thresholds (θva, θvb) are (5, 20), the result of the comparison processing satisfies Formula (14). The frame range of temporally adjacent pixels is set to the range of up to four frames before.

The method for setting the frame range based on the magnitude of the velocity vector described above is just an example. Other methods may be used.

For example, the thresholds are not limited to two types. The frame range of temporally adjacent pixels may include other types and ranges of settings.

Instead of setting the frame range by using thresholds as described above, a function using the magnitude of the velocity vector as a variable may be set in advance to calculate the frame range.

Next, the feature amount matching degree calculation step 7 will be described.

In the feature amount matching degree calculation step 7, the pattern recognition apparatus calculates the feature amount matching degree Mn based on the information about the frame range of temporally adjacent pixels determined in each pixel position. As an example, a case of calculating the feature amount matching degree Mn in the pixel position A illustrated in FIG. 13 will be described.

Suppose that the frame range to refer to in the pixel position A is set to up to four frames before in the adjacent range setting step 6. In such a case, in the feature amount matching degree calculation step 7 according to the present exemplary embodiment, the pattern recognition apparatus calculates the reciprocal of a value obtained by adding 1 to an average value of the Hamming distances between the feature amount in the pixel position A and the respective feature amounts in the same pixel positions up to four frames before as the feature amount matching degree Mn. A formula for calculating the feature amount matching degree Mn is given by Formula (16):

$$Mn=1/(\Sigma H/4+1). \qquad \text{Formula (16)}$$

The above-described processing is substantially the same as that of the first exemplary embodiment except that intended adjacent pixels of which the feature amounts are referred to are different. The method for calculating the feature amount matching degree Mn is not limited to the method described above. Distance indexes other than the Hamming distance, such as the Euclidean distance and the Manhattan distance, may be used. Alternatively, for example, like the first exemplary embodiment, a correlation coefficient C between feature amounts may be used.

The processing subsequent to the feature amount matching degree calculation step 7 is also similar to that of the first exemplary embodiment. A detailed description thereof will thus be omitted.

As described above, the voting processing step 5 according to the present exemplary embodiment is characterized in that the range in which the feature amount matching degree Mn is calculated is made variable according to the magnitude of the velocity vector calculated in each pixel position as the characteristic of the object to be recognized. More specifically, that the magnitude of the velocity vector calculated in each pixel position is small means that the motion of the object to be recognized at that pixel is small. Accordingly, in such a case, temporally adjacent frames are expected to have similar feature amounts in the same pixel position across a wide frame range.

In the present exemplary embodiment, the smaller the magnitude of the velocity vector, the wider the pattern recognition apparatus makes the frame range in which the feature amount matching degree Mn is calculated. In such a manner, the pattern recognition apparatus adjusts the frame range where feature amounts are supposed to be more similar. The pattern recognition apparatus can thus calculate the feature amount matching degree Mn in a more appropriate pixel range, and consequently can correctly calculate the above-described weighting amount to a vote.

In the present exemplary embodiment, the case where the input pattern is a distance image is described. Like the first exemplary embodiment, the present exemplary embodiment is applicable even if the input pattern is a luminance image. The present exemplary embodiment and the first exemplary embodiment have given an actual example of a method for calculating the feature amount matching degree Mn by referring to the frame range of temporally adjacent pixels and the range of spatially adjacent pixel positions in the feature amount matching degree calculation step 7, respectively. Alternatively, both of the ranges may be combined to calculate the feature amount matching degree Mn.

For example, when calculating the feature amount matching degrees Mn by the respective techniques, the pattern recognition apparatus may accumulate the Hamming distances calculated by both methods to calculate an average value.

For example, the feature amount matching degree Mn is calculated by Formula (17):

$$Mn=1/(\text{Average}(H)+1), \qquad \text{Formula (17)}$$

where Average (H) is a formula for calculating an average value of the Hamming distances.

The method for calculating the feature amount matching degree Mn is not limited to that described above. Distance indexes other than the Hamming distance, such as the Euclidean distance and the Manhattan distance, may be used. Alternatively, for example, like distance images, a correlation coefficient C between feature amounts may be used.

When calculating a feature amount matching degree Mn, the two feature amount matching degrees Mn may be combined by a technique other than that for adding both feature amount matching degrees Mn to calculate an average value as described above. For example, a function using the respective feature amount matching degrees Mn as variables may be set in advance to calculate a combined feature amount matching degree Mn.

A third exemplary embodiment of the present disclosure will be described below with reference to the drawings.

A pattern recognition apparatus according to the present exemplary embodiment differs from the voting processing step 5 according to the first exemplary embodiment in the processing of the adjacent range setting step 6. Therefore, the present exemplary embodiment will be described for only points specific to the present exemplary embodiment, and a description of the contents described in the first exemplary embodiment will be omitted.

In the adjacent range setting step 6 of the voting processing step 5 according to the present exemplary embodiment, the pattern recognition apparatus sets the range of spatially adjacent pixel positions pixel by pixel based on a characteristic of the object to be recognized.

In the present exemplary embodiment, as the characteristic of the object to be recognized, the pattern recognition apparatus refers to a size of each joint stored in the dictionary described above, corresponding to the feature amount calculated for each pixel. As employed herein, the size of a joint refers to the size of a human body shape around which the joint exists.

Figure 14:
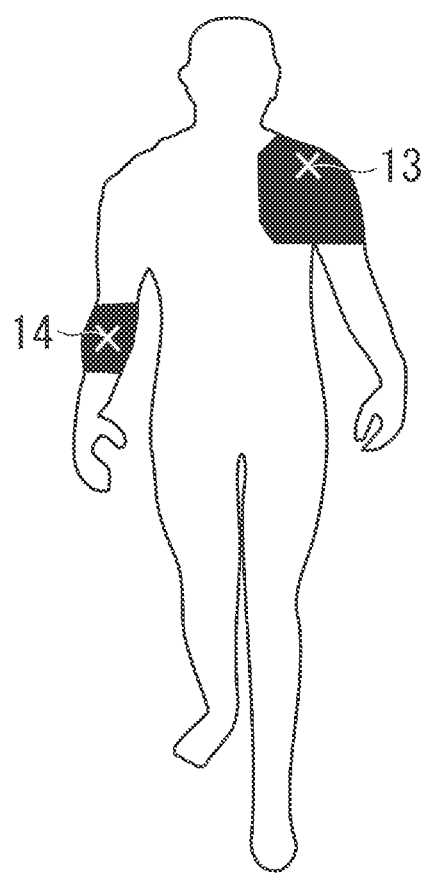
FIG. 14 is a diagram illustrating an example of a human body shape according to a third exemplary embodiment.

For example, in a human body shape illustrated in FIG. 14, a human body structure area widely covered with muscles usually spreads out around a shoulder joint center position 13 (marked with a white X in FIG. 14). A human body structure area around an elbow joint center position 14 is limited to a relatively narrow (thin) area such as an arm. The sizes of the joints are defined with reference to the sizes of such human body structure areas spreading around the joint center positions.

An example of a method for quantitatively setting the sizes of the joints may include determining the size of each joint of a human body in terms of the area of a minimum section obtained by cutting the joint by a plane passing through the joint center. In the present exemplary embodiment, for example, the area of the minimum section passing through each joint center position is calculated and set as the size of the joint based on a human body shape model of a typical adult male, generated by computer graphics (CG).

Examples of sizes Sls and Sre of the left shoulder joint and the right elbow joint illustrated in FIG. 14 are given by Formulas (19) and (20):

Left shoulder: $Sls=70$, Formula (19)

Right elbow: $Sre=20$. Formula (20)

(The sizes are in dimensionless numbers.)

The above-described method for setting the sizes of the joints is just an example. Other methods may be used. For example, the amount of muscles constituting a human body is usually in proportion to the size of bones supporting the muscles. As another setting method, the size of a joint may thus be set by using the volume of bones constituting (connecting) the joint. The present disclosure is therefore not limited to a particular method for setting a joint size.

Figure 15A:
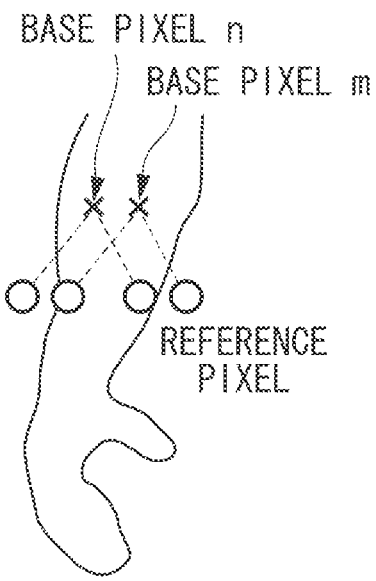
FIGS. 15A and 15B are diagrams illustrating examples of reference pixels according to the third exemplary embodiment.
Figure 15B:
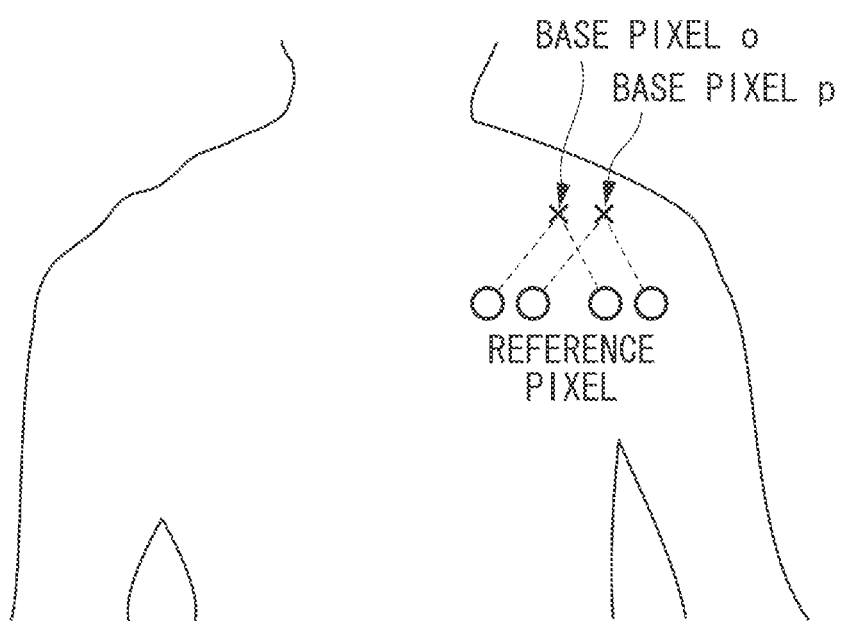

Now, in a case of a small joint (for example, an elbow join), in the feature amount extraction step 4 described in the first exemplary embodiment, as illustrated in FIG. 15A, for example, a pattern of whether the reference points of a base pixel m are included in the human body area differs from that with a base pixel n at some distance. The relationship in magnitude between a reference point pair is thus expected to change easily. In FIGS. 15A and 15B, a reference point pair is illustrated by white circles connected with a base pixel by dotted lines.

In the case of a larger joint (for example, a shoulder joint), as illustrated in FIG. 15B, there is similar image data across a wide range near a base pixel o. In such a case, for example, the relationship in magnitude between a reference point pair is expected to be less likely to change even at a base pixel p somewhat away from the base pixel o.

As described above, the range of peripheral adjacent pixels having similar feature amounts is expected to vary depending on the size of the joint. In the adjacent range setting step 6 according to the present exemplary embodiment, the range of spatially adjacent pixel positions in which the feature amount matching degree Mn is calculated is thus set according to the size S of the joint.

For example, with two types of thresholds (θsa, θsb) prepared for the size S of each joint in advance, the pattern recognition apparatus performs comparison processing with S as expressed by the following Formulas (21) to (23):

$0 < S \leq \theta sa$, Formula (21)

$\theta sa < S \leq \theta sb$, Formula (22)

$\theta sb < S$. Formula (23)

If the result of the comparison processing satisfies Formula (21), the pattern recognition apparatus sets the range of spatially adjacent pixel positions to the range of eight peripheral pixels. If the result of the comparison processing satisfies Formula (22), the pattern recognition apparatus sets the range of spatially adjacent pixel positions to the range of 24 peripheral pixels. If the result of the comparison processing satisfies Formula (23), the pattern recognition apparatus sets the number of spatially adjacent pixel positions to the range of 48 peripheral pixels.

The ranges of pixel positions each exclude the base pixel located at the center. For example, suppose that the left shoulder joint has a size of Sls=70 and the values of the thresholds (θsa, θsb) are (50, 100). In such a case, the result of the comparison processing satisfies Formula (22). The range of spatially adjacent pixel positions is thus set to 24 peripheral pixels.

The pattern recognition apparatus performs such processing on all the intended joints to be voted for, obtained by referring to the dictionary. The pattern recognition apparatus thereby sets the range of spatially adjacent pixel positions for each joint.

The processing subsequent to the adjacent range setting step 6 is similar to that of the first exemplary embodiment. A detailed description thereof will thus be omitted.

As described above, the voting processing step 5 according to the present exemplary embodiment is characterized in that the range, in which the feature amount matching degree Mn is calculated, made variable according to the size of each joint serving as the characteristic of the object to be recognized. More specifically, a joint of small size is expected to have a narrow pixel area where feature amounts are similar. The range of spatially adjacent pixel positions to refer to is thus set to be small. On the other hand, a joint of large size is expected to have a wide pixel area where feature amounts are similar. The range of spatially adjacent pixel positions to refer to is thus set to be large. In such a manner, the pattern recognition apparatus adjusts the range of spatially adjacent pixel positions where feature amounts are supposed to be similar. The pattern recognition apparatus can thus calculate the feature amount matching degree Mn in a more appropriate pixel range, and consequently can correctly calculate the foregoing weighting amount to a vote.

The above-described method for setting the range of pixel positions based on the size of a joint is just an example. Other methods may be used.

Like the first exemplary embodiment, the pattern recognition apparatus may calculate the feature amount matching degree Mn in combination with the second exemplary embodiment.

A fourth exemplary embodiment of the present disclosure will be described below with reference to the drawings.

A pattern recognition apparatus according to the present exemplary embodiment differs from the voting processing step 5 according to the second exemplary embodiment in the processing of the adjacent range setting step 6. The present exemplary embodiment will thus be described in only points specific to the present exemplary embodiment, and a description of the contents described in the second exemplary embodiment will be omitted.

In the voting processing step 5 according to the present exemplary embodiment, like the second exemplary embodiment, the pattern recognition apparatus sets the range of temporally adjacent distance image frames based on a characteristic of the object to be recognized in the adjacent range setting step 6. A difference from the second exemplary embodiment lies in that the pattern recognition apparatus refers to mobility of each joint stored in the dictionary, corresponding to the feature amount calculated for each pixel, as the characteristic of the object to be recognized.

Figure 16:
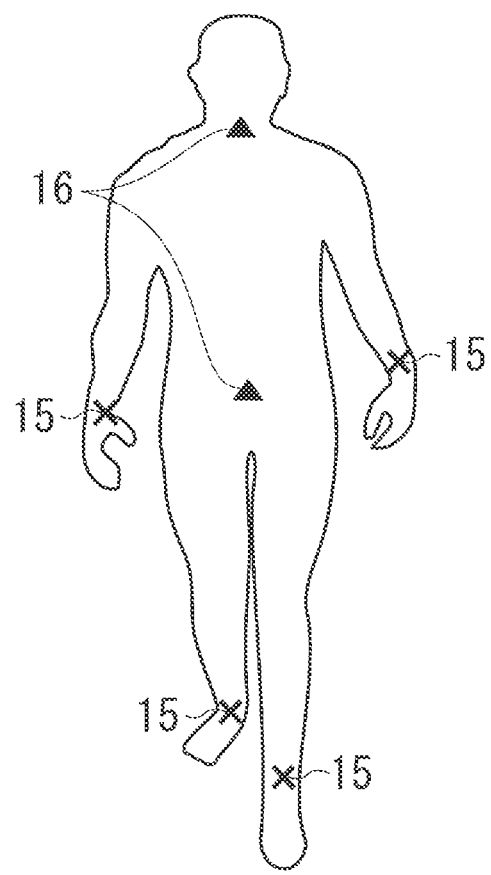
FIG. 16 is a diagram illustrating an example of a human body shape according to a fourth exemplary embodiment.

As employed herein, the mobility of a joint refers to the ease of a temporal change of the joint position in three-dimensional space. For example, in a human body shape illustrated in FIG. 16, the center positions of joints 15 located at ends, such as the wrists and ankles, are usually expected to make a relatively large change over time (highly mobile). On the other hand, joints 16 existing in positions closer to the center of gravity of the human body, such as the waist and neck, are expected to make a small change over time (less mobile). In FIG. 16, the joint centers of the wrists and ankles are marked with an X, and the joint centers of the waist and neck are marked with a triangle.

The mobility of a joint is thus defined with respect to the ease of a positional change of the joint over time, resulting from the joint position on the human body.

Figure 17A:
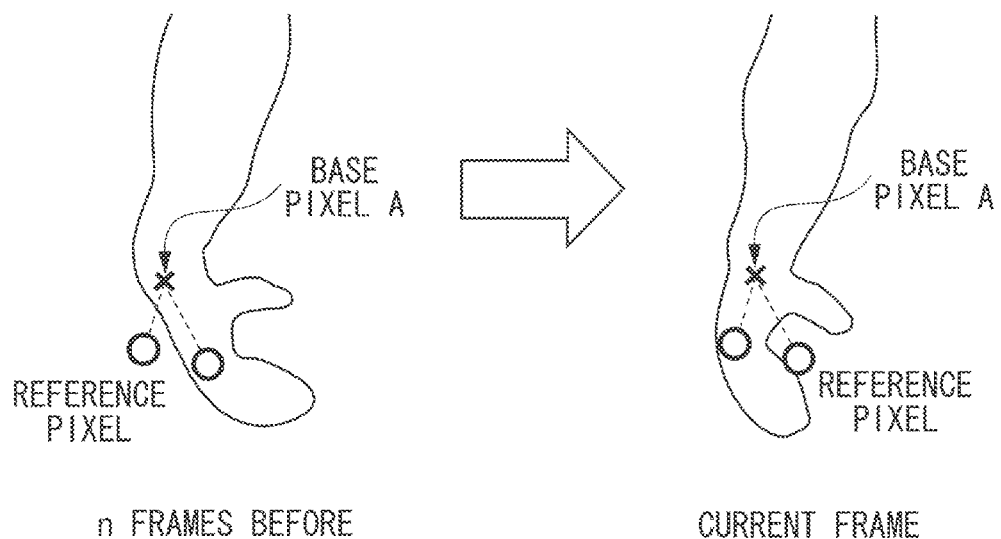
FIGS. 17A and 17B are diagrams illustrating examples of reference pixels according to the fourth exemplary embodiment.
Figure 17B:
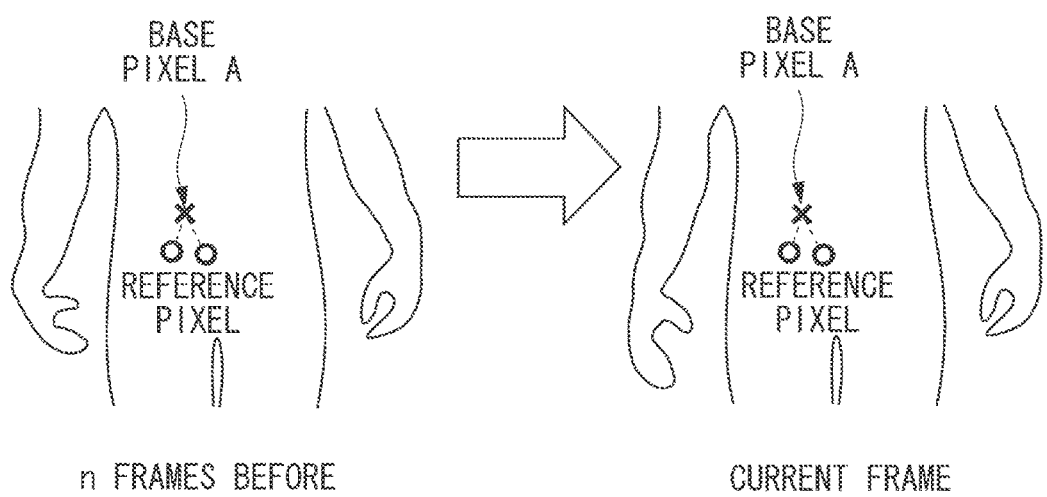

In the feature amount extraction step 4 described in the second exemplary embodiment, regarding a highly mobile joint (for example, a wrist joint), as illustrated in FIG. 17A, the joint position can change between just a few image frames. Therefore, the relationship in magnitude between a reference point pair at a base pixel A located in the same position on the image is expected to be likely to change. In FIGS. 17A and 17B, a reference point pair is illustrated by white circles connected with a base pixel by dotted lines.

In the case of a less variable joint (such as a waist joint), the joint position is likely to change by an amount smaller than that of the wrist between several image frames. Thus, the relationship in magnitude between the reference point pair at the base pixel A is expected to be less likely to change.

As described above, the range of image frames where feature amounts are similar is expected to vary depending on the mobility of the joint. In the adjacent range setting step 6 according to the present exemplary embodiment, the pattern recognition apparatus therefore sets the frame range of temporally adjacent pixels in which the feature amount matching degree Mn is calculated according to the mobility of the joint. More specifically, for example, the 12 types of joints of a human body serving as the objects to be recognized, described in the first exemplary embodiment, are divided into the following three groups. The pattern recognition apparatus then sets the frame range of temporally adjacent pixels corresponding to each group:
Low mobility: the waist→up to eight frames before;
Medium mobility: the neck, left shoulder, right shoulder, left knee, right knee, left elbow, and right elbow→up to four frames before; and
High mobility: the left wrist, right wrist, left ankle, and right ankle→up to one frame before.

The pattern recognition apparatus performs the above-described processing on all the intended joints to be voted for, obtained by referring to the dictionary. The pattern recognition apparatus thereby sets the frame range of temporally adjacent pixels for each joint.

The grouping of the frame ranges of adjacent pixels corresponding to the mobility of the joints described in the present exemplary embodiment may be written in the dictionary in advance.

The processing subsequent to the adjacent range setting step 6 is similar to that of the second exemplary embodiment. A detailed description thereof will thus be omitted.

As described above, the voting processing step 5 according to the present exemplary embodiment is characterized in that the range in which the feature amount matching degree Mn is calculated is made variable according to the mobility of each joint serving as a characteristic of the object to be recognized. More specifically, a highly variable joint is expected to have a narrow frame range where feature amounts are similar in a specific pixel position. For such a joint, the pattern recognition apparatus sets a narrow frame range of temporally adjacent pixels to refer to.

On the other hand, a less variable joint is expected to have a wide frame range where feature amounts are similar. For such a joint, the pattern recognition apparatus sets a wide frame range of temporally adjacent pixels to refer to. In such a manner, the pattern recognition apparatus adjusts the frame range of temporally adjacent pixels where feature amounts are supposed to be similar. Thus, the pattern recognition apparatus can calculate the feature amount matching degree Mn in a more appropriate frame range, and consequently can correctly calculate the foregoing weighting amount to a vote.

The above-described method for setting the range of pixel positions based on the mobility of a joint is just an example. Other methods may be used. It will be understood that other grouping methods based on the mobility of a joint and other setting patterns of the range of adjacent frames may also be used.

Like the second exemplary embodiment, the present exemplary embodiment may calculate the feature amount matching degree Mn in combination with the first and third exemplary embodiments.

A fifth exemplary embodiment of the present disclosure will be described below with reference to the drawings.

A pattern recognition apparatus according to the present exemplary embodiment differs from the process for generating the dictionary and the processing in the adjacent range setting step 6 of the voting processing step 5 according to the first to fourth exemplary embodiments.

Therefore, the present exemplary embodiment will be described in only respects specific to the present exemplary embodiment, and a description of the contents described in the first to fourth exemplary embodiments will be omitted.

In the process of generating the dictionary according to the present exemplary embodiment, a distance image set obtained by continuously capturing the motion of a human body in a time-series manner is used as distance images.

For example, in the present exemplary embodiment, the pattern recognition apparatus generates the dictionary from a distance image set of a total of 100 distance images obtained by capturing a series of motions of a human body walking in a direction across the distance image capturing apparatus 1.

When generating the dictionary by using the distance image set, the pattern recognition apparatus performs the entire process for generating the dictionary described in the first exemplary embodiment. In the present exemplary embodiment, the pattern recognition apparatus extracts information for setting the ranges of spatially and temporally adjacent pixels in the adjacent range setting step 6 from the above-described distance image set.

First, a method for extracting the information for setting the range of spatially adjacent pixels in a dictionary generation step will be described.

In the dictionary generation step according to the present exemplary embodiment, the pattern recognition apparatus extracts a base pixel at random from pixels belonging to a human body area in each distance image and performs the feature amount extraction processing as described in the first exemplary embodiment.

At the same time, the pattern recognition apparatus also performs the feature extraction processing on pixel positions around the base pixel. The pattern recognition apparatus further calculates feature amount matching degrees Mn between the feature amount at the base pixel and the feature amounts in the pixel positions around. The pattern recognition apparatus further calculates spatial and temporal ranges in which an average value of the feature amount matching degrees Mn falls within a predetermined threshold.

For example, suppose that the Hamming distances between the feature amount at the base pixel extracted from a distance image and the feature amounts in the peripheral pixel positions are calculated as illustrated in FIG. 18. Suppose that the threshold of the feature amount matching degree Mn is 0.6. The average values of the feature amount matching degrees Mn in the pixel areas surrounded by frames (1) to (3) of FIG. 18 are:
(1) 0.80, (2) 0.62, and (3) 0.48.
The pixel areas having the feature amount matching degrees Mn at or above the above-described threshold are (1) and (2). In such a case, the wider pixel range (2) is determined to be an adjacent range in which to calculate the feature amount matching degree Mn.

The pattern recognition apparatus associates the information about the adjacent range obtained thus with the base pixel.

Next, a method for extracting the information for setting the range of temporally adjacent pixels will be described.

First, the pattern recognition apparatus performs the feature extraction processing concerning the above-described base pixel on the same pixel position in consecutive past frames. The pattern recognition apparatus further calculates feature amount matching degrees Mn between the feature amount at the base pixel and the feature amounts in the pixel position in the consecutive past frames. The pattern recognition apparatus further calculates a frame range where an average value of the feature amount matching degrees Mn falls with a predetermined threshold.

For example, suppose that the Hamming distances between the feature amount at the above-described base pixel and the feature amounts in the same pixel position in the consecutive past frames are calculated as illustrated in FIG. 19. Suppose that the threshold of the feature amount matching degree Mn is 0.6. The average values of the feature amount matching degrees Mn in the past frames in frame ranges a to c of FIG. 19 are:
a: 1.00, b: 0.67, and c: 0.42,
where the frame range a is up to one frame before, the frame range b is up to four frames before, and the frame range c is up to eight frames before.

The frame ranges a and b have feature amount matching degrees Mn at or above the above-described threshold. In such a case, the wider frame range b is determined to be the frame range in which the feature amount matching degree Mn is calculated.

The pattern recognition apparatus also associates the information about the adjacent range obtained thus with the base pixel.

Like the process for generating the dictionary described in the first exemplary embodiment, the pattern recognition apparatus performs the above-described processing for extracting the ranges of spatially and temporally adjacent ranges on all base pixels extracted at random from the human body area in each distance image.

Next, in the dictionary generation step according to the present exemplary embodiment, like the first exemplary embodiment, the pattern recognition apparatus tabulates base pixels of which the same feature amounts are calculated in the tabulation processing step 12. At that time, the pattern recognition apparatus averages the ranges of spatially and temporally adjacent pixels determined from the base pixels tabulated by the same feature amount as described above for each joint.

In the present exemplary embodiment, as described above, the range of spatially adjacent pixels is limited to a square pixel range. The pattern recognition apparatus then calculates and rounds up an average value of the length of one side to determine a square area having the number of pixels expressed by an integer value as a side. For the frame range of temporally adjacent pixels, the pattern recognition apparatus also calculates and rounds up an average to determine a frame range expressed by an integer value.

The pattern recognition apparatus performs the above-described processing on each joint of each feature amount, and stores the resulting information about the ranges of spatially and temporally adjacent pixels into the dictionary. The method for determining the ranges of spatially and temporally adjacent pixels about a base pixel tabulated by the same feature amount may be a method other than calculating average values as described above.

For example, instead of respectively averaging the ranges of spatially and temporally adjacent pixels, the pattern recognition apparatus may employ pixel ranges that are most frequently selected. Various other techniques may be used to finally calculate the ranges of spatially and temporally adjacent pixels. The present disclosure is not intended to limit such techniques.

Next, the processing of the adjacent range setting step 6 in the voting processing step 5 will be described.

In the adjacent range setting step 6 according to the present exemplary embodiment, the pattern recognition apparatus sets the ranges of spatially and temporally adjacent pixels pixel by pixel by referring to the pixel ranges stored in the dictionary. More specifically, the pattern recognition apparatus refers to the dictionary based on a feature amount extracted for each pixel of an input pattern, and sets the ranges of spatially and temporally adjacent pixels corresponding to the feature amount.

All the processing other than described above is similar to that of the first to fourth exemplary embodiments. A description thereof will thus be omitted.

As described above, the pattern recognition apparatus according to the present exemplary embodiment sets the ranges of spatially and temporally adjacent pixels by referring to the distance images used when generating the dictionary. In particular, the pattern recognition apparatus uses a set of distance images consecutive in a time-series manner. As a result, the pattern recognition apparatus can set the ranges of adjacent pixels according to the motion of an actual human body. Thus, the pattern recognition apparatus can calculate the feature amount matching degree Mn in an appropriate pixel range, and can consequently calculate a more correct weighting amount to a vote.

A sixth exemplary embodiment of the present disclosure will be described below with reference to the drawings.

A pattern recognition apparatus according to the present exemplary embodiment differs from the pattern recognition processing according to the first exemplary embodiment in that approximate positions of the objects to be recognized in an input pattern are known in advance. Another difference lies in the processing of the adjacent range setting step 6 in the voting processing step 5.

The present exemplary embodiment will thus be described in only points specific to the present exemplary embodiment, and a description of the contents described in the first exemplary embodiment will be omitted.

As described above, at the time of the pattern recognition processing, approximate positions of the objects to be recognized are known in advance to the pattern recognition apparatus according to the present exemplary embodiment. For example, if the pattern recognition apparatus described in the first exemplary embodiment is applied to distance images consecutive in a time-series manner, the joint positions of a human body in the distance image of the previous frame are regarded as indicating approximate joint positions in the distance image of the current frame.

Alternatively, the joint positions of a human body calculated by applying the pattern recognition processing described in the first exemplary embodiment to the distance image of the current frame may be regarded as indicating approximate joint positions. Other techniques may be used to find out approximate positions of the objects to be recognized (in the present exemplary embodiment, joint positions) in an input pattern.

In the present exemplary embodiment, the pattern recognition apparatus performs processing similar to the pattern recognition processing described in the first exemplary embodiment on the distance image of the current frame. A difference lies here in the processing of the adjacent range setting step 6 in the voting processing step 5. More specifically, in the present exemplary embodiment, approximate positions of the joints of the human body in the distance image are known as described above. The pattern recognition apparatus therefore refers to the position information and sets the ranges of adjacent pixels in the adjacent range setting step 6.

More specifically, in the adjacent range setting step 6, according to the first exemplary embodiment, the pattern recognition apparatus refers to the length of an average relative position vector of each joint stored in the dictionary when setting the range of spatially adjacent pixel positions of each pixel based on the characteristic of the object to be recognized. In the present exemplary embodiment, the pattern recognition apparatus refers to the length of a relative position vector between the above-described approximate joint position and the coordinates of the base pixel.

In other words, instead of the average relative position vector corresponding to the feature amount in the current frame in which an error may be included, the pattern recognition apparatus refers to the distance (the length of the relative position vector) from the position of the base pixel to the joint center calculated in the previous frame.

All the processing other than described above is similar to that of the first exemplary embodiment. A description thereof will thus be omitted.

As described above, the pattern recognition apparatus according to the present exemplary embodiment refers to approximate joint positions based on the distance image of the previous frame or the distance image of the current frame, and recursively performs the pattern recognition processing. In this manner, the pattern recognition apparatus can more appropriately set the pixel range in which the feature amount matching degree Mn is calculated, and can consequently calculate a correct weighting amount to a vote.

A seventh exemplary embodiment of the present disclosure will be described below with reference to the drawings.

A pattern recognition apparatus according to the present exemplary embodiment differs from the pattern recognition processing according to the fourth exemplary embodiment in that a motion category of the objects to be recognized in the input pattern is known in advance. Another difference lies in the processing of the adjacent range setting step 6 in the voting processing step 5.

The present exemplary embodiment will thus be described in only points specific to the present exemplary embodiment, and a description of the contents described in the fourth exemplary embodiment will be omitted.

Suppose that as described above, the motion category of the objects to be recognized in the input pattern is known in advance to the pattern recognition apparatus according to the present exemplary embodiment at the time of the pattern recognition processing.

For example, if the pattern recognition apparatus described in the first exemplary embodiment is applied to distance images consecutive in a time-series manner, the motion category of the human body in a distance image is assumed to have been determined from the joint positions of the human body in the distance image of the previous frame.

Alternatively, the motion category of the human body in a distance image may be assumed to have been determined from the joint positions of the human body calculated by applying the pattern recognition processing described in the first exemplary embodiment to the distance image of the current frame.

To determine the motion category from the calculated joint positions of the human body, a method using a neural network may be used. The neural network is trained to output a type of a motion category set in advance with a group of relative position vectors of the respective joint positions to a gravitational center position of the human body as an input.

Other methods may be used to determine the motion category from the joint positions of the human body. The present disclosure is not intended to limit such methods. The motion category may be set by the user of the pattern recognition apparatus according to the present exemplary embodiment.

In the present exemplary embodiment, the pattern recognition apparatus then performs processing similar to the pattern recognition processing described in the fourth exemplary embodiment on the distance image of the current frame. A difference lies here in the processing of the adjacent range setting step 6 in the voting processing step 5.

More specifically, in the present exemplary embodiment, the motion category of the human body in the distance image is known as described above. The pattern recognition apparatus thus uses the information to set the range of adjacent pixels in the adjacent range setting step 6.

More specifically, in the adjacent range setting step 6, according to the fourth exemplary embodiment, the pattern recognition apparatus refers to the mobility of each joint when setting the frame range of temporally adjacent pixels for each pixel based on the characteristic of the object to be recognized. In the present exemplary embodiment, the pattern recognition apparatus refers to the mobility of each joint which is determined based on the foregoing motion category.

For example, suppose that "walk" and "arm rotation" are set in advance as motion categories. The 12 types of joints of a human body serving as the objects to be recognized are grouped by motion category as described below. The pattern recognition apparatus sets the frame range of temporally adjacent pixels corresponding to each of the groups.
"Walk"
Medium mobility: the waist, neck, left shoulder, and right shoulder→up to four frames before; and
High mobility: the left wrist, right wrist, left ankle, right ankle, left knee, right knee, left elbow, and right elbow→up to one frame before.
"Arm Rotation"
Low mobility: the neck, waist, left knee, right knee, left ankle, and right ankle→up to eight frames before;
Medium mobility: the left shoulder and right shoulder→up to four frames before; and
High mobility: the left elbow, right elbow, left wrist, and right wrist→up to one frame before.

The pattern recognition apparatus performs the above-described processing on all the intended joints to be voted for, obtained by referring to the dictionary. The pattern recognition apparatus thereby sets the frame range of temporally adjacent pixels for each joint.

The grouping of the ranges of adjacent pixels corresponding to the mobility of the joints described in the present exemplary embodiment may be written in the dictionary in advance.

The processing subsequent to the adjacent range setting step 6 is similar to that of the fourth exemplary embodiment. A detailed description thereof will thus be omitted.

In such a manner, the pattern recognition apparatus according to the present exemplary embodiment refers to the motion category of the human body determined based on the distance image of the previous frame or the distance image of the current frame, and recursively performs the pattern recognition processing. The pattern recognition apparatus can thus set an appropriate pixel range in which the feature amount matching degree Mn is calculated, and can consequently calculate a correct weighting value to a vote.

In the adjacent range setting step 6 according to the exemplary embodiments of the present disclosure, the characteristic of the object to be recognized by the pattern recognition apparatus to be referred to when setting the range of temporally or spatially adjacent feature amounts is that of the object to be recognized in a result of pattern recognition calculated with respect to a past input pattern. Alternatively, the characteristic may be that of the object to be recognized in a result of pattern recognition separately calculated with respect to the same input pattern.

According to an exemplary embodiment of the present disclosure, even if a feature amount calculated in a pixel position includes an error due to noise or blocking, the effect of the error in the feature amount on recognition performance can be reduced.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2014-171891, filed Aug. 26, 2014, which is hereby incorporated by reference herein in its entirety.

What is claimed is:

1. A pattern recognition apparatus comprising:
one or more memories storing instructions;
one or more processors that, when executing the instructions, cause the apparatus to:
extract a feature amount of each of a plurality of base pixels included in an input image;
set an adjacent range for each of the plurality of base pixels with respect to each of a plurality of objects to be recognized based on respective characteristics for combinations of one of the plurality of objects to be recognized and the feature amount of the base pixel;
calculate, for each of the plurality of base pixels with respect to each of the plurality of objects to be recognized, a degree of matching between the feature amount of the base pixel and the feature amount of each of one or more pixels included in the adjacent range set for the base pixel;
calculate a weight for voting to each of the plurality of objects to be recognized from each of the plurality of base pixels based on the degree of matching between the feature amount of the base pixel and the feature amount of each of one or more pixels included in the adjacent range set for the base pixel; and
estimate each position of a plurality of objects to be recognized by voting to one or more of the plurality of objects to be recognized from each of the plurality of base pixels with a weight calculated for voting to each of the plurality of objects from each of the plurality of base pixels.

2. The pattern recognition apparatus according to claim 1, wherein the one or more processors further cause the apparatus to vote for a voting space by using a previously-learned frequency value or existence probability of each of the plurality of objects to be recognized corresponding to the feature amount.

3. The pattern recognition apparatus according to claim 1, wherein the one or more processors further cause the apparatus to perform the voting based on previously-learned information about a relationship between a feature amount and each of the plurality of objects to be recognized, and the extracted feature amount.

4. The pattern recognition apparatus according to claim 1, wherein the one or more processors further cause the apparatus to calculate a bit code string or vector data as the feature amount.

5. The pattern recognition apparatus according to claim 4, wherein the one or more processors further cause the apparatus to calculate, as the bit code string, a relationship in magnitude between the feature amounts of a plurality of pairs of pixels defined in advance for each pixel of the input image.

6. The pattern recognition apparatus according to claim 1, wherein the one or more processors further cause the apparatus to calculate the degree of matching for each of the plurality of base pixels by using a correlation coefficient between the feature amount of the base pixel and the feature amount of each of the one or more pixels included in the adjacent range of the base pixel.

7. The pattern recognition apparatus according to claim 1, wherein the one or more processors further cause the apparatus to calculate the degree of matching for each of the plurality of base pixels by using a reciprocal of a value obtained by adding 1 to an average value of a Hamming distance between the feature amount of the base pixel and the feature amount of each of the one or more pixels included in the adjacent range of the base pixel.

8. The pattern recognition apparatus according to claim 1, wherein the one or more processors further cause the apparatus to change a number of pixels so that as a distance to each of the plurality of objects to be recognized is shorter, the number of pixels included in the adjacent range is greater.

9. The pattern recognition apparatus according to claim 1, wherein the one or more processors further cause the apparatus to change a number of pixels included in the adjacent range based on any one of a distance to each of the plurality of objects to be recognized, a velocity vector extracted from the input image, and a motion category of each of the plurality of objects to be recognized.

10. The pattern recognition apparatus according to claim 1, wherein each of the plurality of objects to be recognized is a joint of a human body.

11. The pattern recognition apparatus according to claim 10, wherein the one or more processors further cause the apparatus to change a number of pixels included in the adjacent range based on mobility of the joint or a size of the joint.

12. The pattern recognition apparatus according to claim 1, wherein the one or more processors further cause the apparatus to change a number of pixels included in the adjacent range based on a previous recognition result of each of the plurality of objects to be recognized.

13. The pattern recognition apparatus according to claim 1, wherein the adjacent range is an area including one or more pixels adjacent to each of the plurality of base pixels.

14. A pattern recognition method comprising:
    extracting a feature amount of each of a plurality of base pixels included in an input image;
    setting an adjacent range for each of the plurality of base pixels with respect to each of a plurality of objects to be recognized based on respective characteristics for combinations of one of the plurality of objects to be recognized and the feature amount of the base pixel;
    calculating, for each of the plurality of base pixels with respect to each of the plurality of objects to be recognized, a degree of matching between the feature amount of the base pixel and the feature amount of each of one or more pixels included in the adjacent range set for the base pixel;
    calculating a weight for voting to each of the plurality of objects to be recognized from each of the plurality of base pixels based on the degree of matching between the feature amount of the base pixel and the feature amount of each of one or more pixels included in the adjacent range set for the base pixel; and
    estimating a position of each of a plurality of objects to be recognized by voting to one or more of the plurality of objects to be recognized from each of the plurality of base pixels with a weight calculated for voting to each of the plurality of objects from each of the plurality of base pixels.

15. A non-transitory computer-readable storage medium storing a readable program for operating a computer to execute a pattern recognition method comprising:
    extracting a feature amount of each of a plurality of base pixels included in an input image;
    setting an adjacent range for each of the plurality of base pixels with respect to each of a plurality of objects to be recognized based on respective characteristics for combinations of one of the plurality of objects to be recognized and the feature amount of the base pixel;
    calculating, for each of the plurality of base pixels with respect to each of the plurality of objects to be recognized, a degree of matching between the feature amount of the base pixel and the feature amount of each of one or more pixels included in the adjacent range set for the base pixel;
    calculating a weight for voting to each of the plurality of objects to be recognized from each of the plurality of base pixels based on the degree of matching between the feature amount of the base pixel and the feature amount of each of one or more pixels included in the adjacent range set for the base pixel; and
    estimating a position of each of a plurality of objects to be recognized by voting to one or more of the plurality of objects to be recognized from each of the plurality of base pixels with a weight calculated for voting to each of the plurality of objects from each of the plurality of base pixels based on the extracted feature amount and the calculated degree of matching.

* * * * *